United States Patent
Waelbroeck et al.

(10) Patent No.: US 8,041,628 B2
(45) Date of Patent: *Oct. 18, 2011

(54) METHOD FOR DIRECTING AND EXECUTING CERTIFIED TRADING INTERESTS

(75) Inventors: Henri Waelbroeck, Scardsale, NY (US); Fred J. Federspiel, Larchmont, NY (US); James J. Angel, Arlington, VA (US)

(73) Assignee: Pipeline Financial Group, Inc., New York, NY (US)

( * ) Notice: Subject to any disclaimer, the term of this patent is extended or adjusted under 35 U.S.C. 154(b) by 457 days.

This patent is subject to a terminal disclaimer.

(21) Appl. No.: 12/219,161

(22) Filed: Jul. 17, 2008

(65) Prior Publication Data
US 2009/0018973 A1    Jan. 15, 2009

Related U.S. Application Data

(60) Division of application No. 09/870,845, filed on May 31, 2001, now Pat. No. 7,428,506, which is a continuation-in-part of application No. 09/750,768, filed on Dec. 29, 2000, now Pat. No. 8,010,438, which is a continuation-in-part of application No. 09/585,049, filed on Jun. 1, 2000, now Pat. No. 7,356,500.

(51) Int. Cl.
*G06Q 40/00* (2006.01)

(52) U.S. Cl. .......................................... 705/37; 705/38

(58) Field of Classification Search .................... 705/37, 705/38
See application file for complete search history.

(56) References Cited

U.S. PATENT DOCUMENTS

| | | | |
|---|---|---|---|
| 3,648,270 A | 3/1972 | Metz et al. |
| 5,101,353 A | 3/1992 | Lupien et al. |
| 5,136,501 A | 8/1992 | Silverman et al. |
| 5,255,309 A | 10/1993 | Katz |

(Continued)

FOREIGN PATENT DOCUMENTS

AU    2005220858 A1    9/2005

(Continued)

OTHER PUBLICATIONS

Domowitz I: "A Taxonomy of Automated Trade Execution systems", Journal of International Money and Finance of Butterworth Scientific, Guildford, GB, vol. 12, 1993, pp. 607-632.

(Continued)

*Primary Examiner* — Jagdish Patel
(74) *Attorney, Agent, or Firm* — Cowan, Liebowitz & Latman; Steven D. Underwood

(57) ABSTRACT

Preferred embodiments of the subject invention comprise: (a) electronically receiving securities order-related data regarding a set of securities market participants; (b) electronically storing the received order-related data regarding the set of securities market participants; (c) electronically receiving a securities order-related query (or order parameters) from a first securities market participant; (d) based on the order-related query (or order parameters) received from the first securities market participant and on the securities order-related data regarding the set of securities market participants, computing a dissemination list of securities market participants based on ranking likely contras by probability of execution; and (e) transmitting that dissemination list to an entity who has been granted the privilege of receiving such lists in exchange for being contractually bound to respect confidentiality of the dissemination list and to use the list only for the purpose of sending securities-related information to members of the list.

26 Claims, 11 Drawing Sheets

U.S. PATENT DOCUMENTS

| | | | |
|---|---|---|---|
| 5,689,652 | A | 11/1997 | Lupien et al. |
| 5,717,989 | A | 2/1998 | Tozzoli et al. |
| 5,724,524 | A | 3/1998 | Hunt et al. |
| 5,724,525 | A | 3/1998 | Beyers, II et al. |
| 5,794,207 | A | 8/1998 | Walker et al. |
| 5,802,499 | A | 9/1998 | Sampson et al. |
| 5,806,044 | A | 9/1998 | Powell |
| 5,812,988 | A | 9/1998 | Sandretto |
| 5,842,178 | A | 11/1998 | Giovannoli |
| 5,845,266 | A | 12/1998 | Lupien et al. |
| 5,873,071 | A | 2/1999 | Ferstenberg et al. |
| 5,905,975 | A | 5/1999 | Ausubel |
| 5,924,082 | A | 7/1999 | Silverman et al. |
| 5,950,177 | A | 9/1999 | Lupien et al. |
| 6,151,588 | A | 11/2000 | Tozzoli et al. |
| 6,211,880 | B1 | 4/2001 | Impink, Jr. |
| 6,236,979 | B1 | 5/2001 | Kawabata |
| 6,255,309 | B1 | 7/2001 | Pees et al. |
| 6,260,025 | B1 | 7/2001 | Silverman et al. |
| 6,282,521 | B1 | 8/2001 | Howorka |
| 6,285,983 | B1 | 9/2001 | Jenkins |
| 6,285,984 | B1 | 9/2001 | Speicher |
| 6,304,858 | B1 | 10/2001 | Mosler et al. |
| 6,317,727 | B1 | 11/2001 | May |
| 6,317,728 | B1 | 11/2001 | Kane |
| 6,321,205 | B1 | 11/2001 | Eder |
| 6,321,212 | B1 | 11/2001 | Lange |
| 6,343,278 | B1 | 1/2002 | Jain et al. |
| 6,408,282 | B1 | 6/2002 | Buist |
| 6,421,653 | B1 | 7/2002 | May |
| 6,578,014 | B1 | 6/2003 | Murcko, Jr. |
| 6,594,643 | B1 | 7/2003 | Freeny, Jr. |
| 6,622,131 | B1 | 9/2003 | Brown et al. |
| 6,766,304 | B2 | 7/2004 | Kemp, II et al. |
| 6,772,132 | B1 | 8/2004 | Kemp, II et al. |
| 6,912,510 | B1 | 6/2005 | Shepherd |
| 6,938,011 | B1 | 8/2005 | Kemp, II et al. |
| 6,985,883 | B1 | 1/2006 | Togher et al. |
| 7,003,486 | B1 | 2/2006 | Condamoor et al. |
| 7,035,819 | B1 | 4/2006 | Gianakouros et al. |
| 7,099,839 | B2 | 8/2006 | Madoff et al. |
| 7,110,974 | B1 | 9/2006 | Rust |
| 7,130,823 | B1 | 10/2006 | Rayner et al. |
| 7,136,834 | B1 | 11/2006 | Merrin et al. |
| 7,152,042 | B1 | 12/2006 | Arkes |
| 7,162,447 | B1 | 1/2007 | Cushing |
| 7,162,448 | B2 | 1/2007 | Madoff et al. |
| 7,165,045 | B1 | 1/2007 | Kim-E |
| 7,231,363 | B1 * | 6/2007 | Hughes et al. .................. 705/37 |
| 7,308,428 | B1 | 12/2007 | Federspiel et al. |
| 7,356,498 | B2 | 4/2008 | Kaminsky et al. |
| 7,356,500 | B1 | 4/2008 | Waelbroeck et al. |
| 7,401,044 | B1 | 7/2008 | Fraser et al. |
| 7,428,506 | B2 | 9/2008 | Waelbroeck et al. |
| 7,430,533 | B1 | 9/2008 | Cushing |
| 7,565,313 | B2 | 7/2009 | Waelbroeck et al. |
| 7,617,144 | B2 | 11/2009 | Madoff et al. |
| 2001/0027437 | A1 | 10/2001 | Turbeville et al. |
| 2002/0010672 | A1 | 1/2002 | Waelbroeck et al. |
| 2002/0026404 | A1 | 2/2002 | Thompson |
| 2002/0035534 | A1 | 3/2002 | Buist et al. |
| 2002/0046146 | A1 | 4/2002 | Otero et al. |
| 2002/0046149 | A1 | 4/2002 | Otero et al. |
| 2002/0046151 | A1 | 4/2002 | Otero et al. |
| 2002/0049661 | A1 | 4/2002 | Otero et al. |
| 2002/0055901 | A1 | 5/2002 | Gianakouros et al. |
| 2002/0082967 | A1 | 6/2002 | Kaminsky et al. |
| 2002/0128945 | A1 | 9/2002 | Moss et al. |
| 2002/0133449 | A1 | 9/2002 | Segal et al. |
| 2002/0138390 | A1 | 9/2002 | May |
| 2002/0161687 | A1 | 10/2002 | Serkin et al. |
| 2003/0004859 | A1 | 1/2003 | Shaw et al. |
| 2003/0009411 | A1 | 1/2003 | Ram et al. |
| 2003/0018558 | A1 | 1/2003 | Heffner et al. |
| 2003/0069826 | A1 | 4/2003 | Guidi et al. |
| 2003/0083973 | A1 | 5/2003 | Horsfall |
| 2003/0093343 | A1 | 5/2003 | Huttenlocher et al. |
| 2003/0167224 | A1 | 9/2003 | Periwal |
| 2004/0034591 | A1 | 2/2004 | Waelbroeck et al. |
| 2004/0059666 | A1 | 3/2004 | Waelbroeck et al. |
| 2004/0177024 | A1 | 9/2004 | Bok et al. |
| 2004/0193524 | A1 | 9/2004 | Almeida et al. |
| 2004/0210511 | A1 | 10/2004 | Waelbroeck et al. |
| 2004/0236669 | A1 | 11/2004 | Horst et al. |
| 2005/0004852 | A1 | 1/2005 | Whitney |
| 2005/0075963 | A1 | 4/2005 | Balabon |
| 2005/0234795 | A1 | 10/2005 | Hodes et al. |
| 2006/0020538 | A1 | 1/2006 | Ram et al. |
| 2006/0080215 | A1 | 4/2006 | Warsaw et al. |
| 2006/0080219 | A1 | 4/2006 | Lutnick et al. |
| 2006/0206404 | A1 | 9/2006 | Hatheway et al. |
| 2006/0259394 | A1 | 11/2006 | Cushing et al. |

FOREIGN PATENT DOCUMENTS

| | | | |
|---|---|---|---|
| EP | 1939731 | A1 | 7/2008 |
| EP | 2024922 | A2 | 2/2009 |
| GB | 2417576 | A | 1/2006 |
| KR | 20010091523 | A | 10/2001 |
| KR | 2002-0014286 | A | 2/2002 |
| KR | 2005-0001121 | A | 1/2005 |
| KR | 100591611 | B1 | 6/2006 |
| WO | 00/77670 | | 12/2000 |
| WO | 0117519 | A1 | 3/2001 |
| WO | 200193169 | A1 | 12/2001 |
| WO | 0238945 | A1 | 5/2002 |
| WO | 2003048905 | A2 | 6/2003 |
| WO | 2005003894 | A2 | 1/2005 |
| WO | 2007127041 | A2 | 11/2007 |
| WO | 2007127857 | A2 | 11/2007 |
| WO | 2008071363 | A2 | 6/2008 |
| WO | 2009015387 | A2 | 1/2009 |
| WO | 2009015391 | A2 | 1/2009 |
| WO | 2009039791 | A1 | 4/2009 |
| WO | 2009046258 | A2 | 4/2009 |
| WO | 2009059814 | A2 | 5/2009 |
| WO | 2009126638 | A2 | 10/2009 |
| WO | 2009126683 | A2 | 10/2009 |

OTHER PUBLICATIONS

J. D. Farmer and N. Zamani, "Mechanical vs. Informational Components of Price Impact," 2006; http://www.santafe.edu/research/publications/workingpapers/ 06-09-034.pdf; pp. 1-19.

Hendershott, T., "Electronic Trading in Financial Markets," IT Pro, Jul./Aug. 2003, pp. 10-14.

Clemons, E.K., et al.: "Restructuring Institutional Block Trading: An Overview of the Optimark System" System Sciences, 1998., Proceedings of the Thirty-First Hawaii International Conference on Kohala Coast, HI, USA Jan. 6-9, 1998, Los Alamitos, CA, USA, IEEE Comput. Soc., US, vol. 6, Jan. 6, 1998 (pp. 301-310) isbn: 0-8186-82555-8.

Weinhardt, C., et al., 'Agent-Mediated Off-Exchange Trading, Systems Sciences, 1999. HICSS-32., Proceeedings of the 32nd Annual Hawaii International Conference on Maui, HI, USA Jan. 5-8, 1999, Los Alamitos, CA, USA, IEEE Comput. Soc., US, Jan. 5, 1999, p. 6pp, ISBN: 0-7695-0001-3.

Madden, Bartley J., "Structural Changes in Trading Stocks," The Journal of Portfolio Management, Fall 1993, pp. 19-27.

* cited by examiner

Trading partners

Counterparty initiations

| | Date | Time | Side | Symbol | Qty | Type | From |
|---|---|---|---|---|---|---|---|
| ☐ | 6/1/00 | 8:51 AM | SELL | PSFT | 10M | MID | |
| ☑ | 6/1/00 | 8:49 AM | BUY | DELL | 100M | MID | |

920

Counterparty executions

| | Date | Time | Side | Symbol | Qty | Fill price |
|---|---|---|---|---|---|---|
| ☐ | 6/1/00 | 8:51 AM | SELL | PSFT | 10M | 70.65 |
| ☐ | 6/1/00 | 8:50 AM | BUY | MSFT | 300M | 70.65 |
| ☑ | 6/1/00 | 8:51 AM | BUY | DELL | 100M | 71.0 |

930

[OK] [CANCEL]

METHOD FOR DIRECTING AND EXECUTING CERTIFIED TRADING INTERESTS

CROSS REFERENCE TO RELATED APPLICATIONS

This application is a division of application Ser. No. 09/870,845, filed May 31, 2001, which is a continuation-in-part of application Ser. No. 09/750,768, filed Dec. 29, 2000, which is a continuation-in-part of application Ser. No. 09/585,049, filed Jun. 1, 2000, now U.S. Pat. No. 7,356,500, issued Apr. 8, 2008. The entire contents of each are incorporated herein by reference.

FIELD OF THE INVENTION

The subject invention relates to a method for managing certified trading information to direct and execute confidential trading interests over a computer network such as the Internet.

BACKGROUND THE INVENTION

The term "trading interest" is used herein to describe any expressed interest in trading a given security or securities, and the term "certified trading interest" is used herein to describe a trading interest that has been verified as genuine and certified as such by some trusted third party. One example of a genuine trading interest is an order that has been placed on a securities market automatic matching system. A second example of a genuine trading interest is a trading interest expressed by a party with a documented history of aggressive trading. An example of a trading interest that would not be certified is an undocumented indication of interest (known in the art as an 101).

In public securities markets, market mechanics and trading psychology create barriers to efficient information dissemination and price discovery. A market participant's decision to reveal information regarding a large trading interest typically represents a tradeoff between confidentiality and liquidity. As used herein, the term "market participant" refers to any person or firm with the ability to trade securities; examples of market participants include broker-dealers, buy-side firms, sell-side firms, and private investors trading on electronic communication networks (ECNs). "Buy-side" firms are those that buy new issues of securities, as distinct from broker-dealer firms that "sell" such new issues.

By publicly revealing the details of a significant active buying interest, for example, a market participant assumes the risk of adverse price action. Other market participants with legitimate selling interests and market makers can "fade" their offers (become much less aggressive sellers). There is also an empirically demonstrable risk of adverse price action due to "front running" (buying activity by market participants in anticipation of price movement resulting from the large revealed order). Confidentiality can be maintained by splitting the large order up into many small orders to avoid arousing interest, but this is inefficient and will fail to attract substantial natural contra-interests. An economically efficient transaction is therefore missed because the trading costs associated with disseminating information are too high. Also, the common practice of splitting large interests into smaller orders affects all price discovery. When confronting each order, a market participant must incorporate the possibility that the order is only a small part of a much larger interest, because it is often impossible for the market participant to verify that many such orders are not being sent simultaneously.

Another serious obstacle to efficient dissemination of trading interests and price discovery is the lack of validated information about trading interests. The validated trading interest information which does exist (e.g., displayed executable orders) is often of little assistance. Displayed orders are minuscule compared to undisclosed interest, and typically equate to no more than one or two minutes of trading in a liquid stock in the U.S. market. Displayed orders can therefore be easily manipulated, for example, to indicate excess buying interest when sellers are in fact abundant. In addition, non-validated misinformation is often created and disseminated by unscrupulous market participants to manipulate market prices. Voluntarily disseminated trading interests can be false or misleading if they are not verified either by proof of a current executable order, actual trades executed, or canceled orders which were at one point executable at risk in the market. Because there is often no way for a market participant to verify an expressed trading interest or to know which other market participants have a history of unscrupulous trading behavior, all prices must incorporate the possibility of such behavior.

One known approach to voluntary selective dissemination of non-validated trading interests and activity in public equity markets is used by the AutEx+® system. This is an electronic database and online network that provides users with the ability to voluntarily publicly indicate trading interests and executed trades. AutEx+® users can limit the recipients of a message regarding a trading interest by inclusion (a user-defined list) or exclusion (blocking specific named market participants). Users can also limit by name the securities on which they receive information and the other users from whom they receive information.

In the AutEx+® system the expressed trading interests and reported trades are not certified, however, and this creates the opportunity for deceptive dissemination of tracking information. In addition, users of the system are not obligated to report all trades, which offers further opportunities to create false impressions of trading interests. Significantly, this approach does not permit the use of certified trading interests (CTI) to limit information dissemination to those market-participants likely to have a contra-interest. It also does not enable using such CTI analysis to permit market participants to limit the trading interest indications received. It also does not provide the ability to initiate an auction based on disseminated CTI analysis information. It also does not enable the monitoring of user trading activity to generate a rating of the accuracy of disclosures or the correlation of trading activity to inappropriate trading practices.

One known approach to matching trading interests and executing trades while limiting information dissemination is employed by the POSIT® matching system. The POSIT® system allows trading interests to accumulate and initiates a matching sequence at set intervals. Market participants place confidential orders in the system and are unaware of the amount or aggressiveness of other orders on the same or contra side until the matching is released. This approach does not enable targeted communication of trading interests based on analysis of verified executable interests and trading activity, and does not provide the ability to initiate private auctions based on this analysis. It also does not permit granting the auction initiator any exclusivity over contra-orders entered in response to the targeted dissemination.

In this environment, there is an acute need for efficient dissemination of confidential information regarding trading interests. Market participants with large confidential trading interests wish to notify only those other market participants likely to have a significant contra-interest. Other market participants wish to be notified of confidential certified trading interests to which they are likely to have a contra-interest. Both groups wish to have a place to transact a trade once they have been connected through analysis of their certified trading interests. Market participants also desire a means of certifying expressed trading information and access to certified information regarding the trading behavior of other market participants.

SUMMARY

Preferred embodiments of the subject invention overcome the limitations of known trading interest dissemination and execution systems by (1) enabling market participants to limit dissemination of trading interests to only those other market participants likely to have a significant contra-interest, (2) enabling market participants to ensure that other market participants' disseminated trading interests are legitimate, and (3) enabling auctions among trading interests targeted and validated in this manner. Software of a preferred embodiment identifies likely contra-interests by analyzing information from various sources regarding certified trading interests.

A preferred embodiment comprises a method of managing market information, comprising the steps of: electronically receiving securities order-related or trade-related data regarding a set of securities market participants; electronically storing said received order-related or trade-related data regarding said set of securities market participants; electronically receiving a securities order-related or trade-related query from a first securities market participant; based on said order-related or trade-related query received from said first securities market participant and on said securities order-related or trade-related data regarding said set of securities market participants, computing a dissemination list of securities market participants; and transmitting said dissemination list to an entity who has been granted a privilege of receiving such lists in exchange for being contractually bound to respect confidentiality of the dissemination list and to use the list only for the purpose of sending securities-related information to members of the list.

Further embodiments are described below.

BRIEF DESCRIPTION OF DRAWINGS

FIG. 9 depicts a graphic user interface of a preferred embodiment.

DETAILED DESCRIPTION OF PREFERRED EMBODIMENTS

Figure 1:
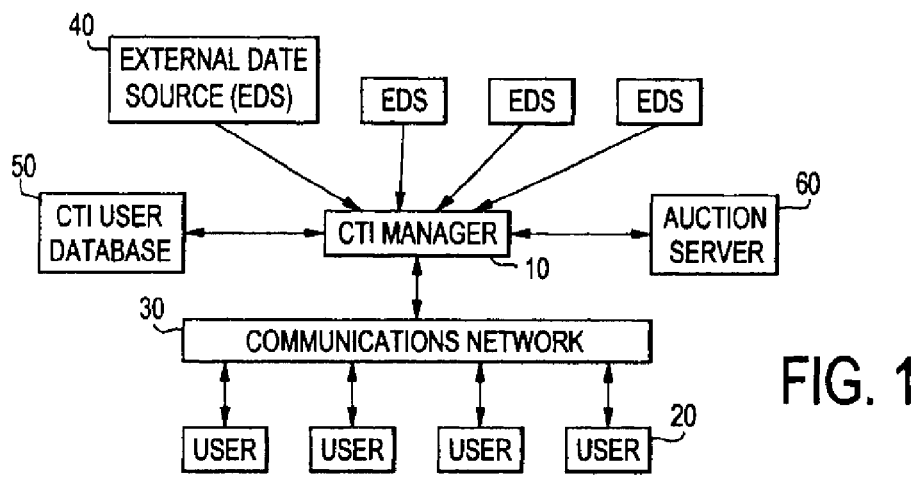
FIG. 1 is a schematic diagram depicting a preferred embodiment of the subject invention.

FIG. 1 illustrates a system configuration of a preferred embodiment of the subject invention that comprises a certified trading interest (CTI) manager 10 connected to various users 20 via a communication network 30. CTI manager 10 is a computer comprising a processor, a memory, and input/output including a communications interface. Computer programs stored in the memory operate the CTI manager in accordance with the invention. In the preferred embodiment, communication network 30 is the Internet, but alternate embodiments can employ dedicated communication networks, as is well known in the art. In the preferred embodiment, communication between users and the CTI manager is secured, because of the confidential nature of the information communicated. The CTI manager 10 is also connected to various external data sources 40, a CTI user database 50, and an auction server 60.

External data sources 40 provide information regarding positions held, trades executed, and active orders for the users 20. This enables the CTI manager to identify and verify users' historical and current trading interests. In an alternate embodiment, the CTI manager does not receive external data, but only uses data generated within the system. In a preferred embodiment applied to the U.S. equity market, the external data sources 40 include various electronic communication networks (ECNs) such as Instinet™, public markets such as NASDAQ™, stock exchanges, matching networks such as POSIT®, and publicly available data such as the published holdings of various institutional investors. In a preferred embodiment, the data regarding market participants used by the CTI manager comprises confidential information. For example, the identity of an executable order on an ECN is not typically available. Since the confidential information is not publicly available, the CTI system must obtain permission from the users 20 to utilize it. In the preferred embodiment users 20 agree to release this confidential information to the CTI system, with the understanding that the secure CTI system will use the information only for supplying the user with valuable confidential trading interests of others. In other words, the confidential information with which users 20 entrust the CTI manager 10 gives them access to more information (in particular, certified trading interests), but the confidential information provided by users 20 does not leak out to third parties.

In a preferred embodiment, the CTI manager 10 communicates in real time with external data sources 40 via the Internet. Alternate embodiments employ dedicated communication networks as is well known in the art. Also, alternate embodiments store information from external data sources 40 in a database and update the information periodically rather than in real time. For example, an alternate embodiment receives information regarding the published holdings of various institutional investors, stores the information in a database, and updates the information from the news service source only as frequently as new information is published. As will be apparent to those skilled in the art, the subject invention could also be used to direct confidential information in markets other than U.S. equities, since virtually all markets for fungible items of value pose the same informational inefficiencies.

In a preferred embodiment, the CTI user database 50 contains user data such as security and contact information, CTI notification parameters, and an activity history. The preferred embodiment maintains an activity history for each user that includes auctions initiated and their outcome (e.g., whether the auction was canceled, unsuccessful in locating a contra-interest, or resulted in a partial or full execution of the initiating interest). The activity history also includes the CTI notifications received, the orders placed in response, and their outcome (whether the responding order was canceled, unsuccessful, or resulted in a partial or full execution of the response order). In an alternate preferred embodiment, the CTI user database 50 simply maintains overall statistics regarding this activity history for each user.

The CTI notification parameters specify the circumstances in which CTI information is to be received and can be different for different securities and different users. For example, some users may limit CTI notifications to initiating interests over 100,000 shares for certain securities and 500,000 shares for others. In a preferred embodiment the notification parameters can be modified by the user at any time, and can be on the basis of order size, security, identity of initiating user, or statistics regarding the initiating user's activity history.

In an alternate preferred embodiment, the CTI user database 50 also contains information regarding inappropriate trading behavior such as peg gaming and front running. Peg gaming is possible when an auction sets the execution price to be the market midpoint at a specific time. An auction participant with a large buy order might sell actively in the market to pull the midpoint price down. Front running is possible in this context if, for example, a recipient of a notification of a large buy order starts buying CTI trades actively before the auction in anticipation of price action caused by the large CTI. The CTI manager of this embodiment will monitor the trading activity of all auction participants and note any suspected peg gaming or front running in the CTI user database, either as raw data or as a rating of trading behavior. An alternate embodiment maintains similar data and/or ratings in the CTI user database 50 regarding the accuracy of the market participants' non-certified disclosures on external systems such as AutEx+®. A further embodiment maintains similar data and/or ratings in the CTI user database 50 regarding the market participants' adherence to self-imposed trading limits set during negotiations. This list is not intended to be exhaustive; other embodiments will be apparent to those skilled in the art.

Figure 2:
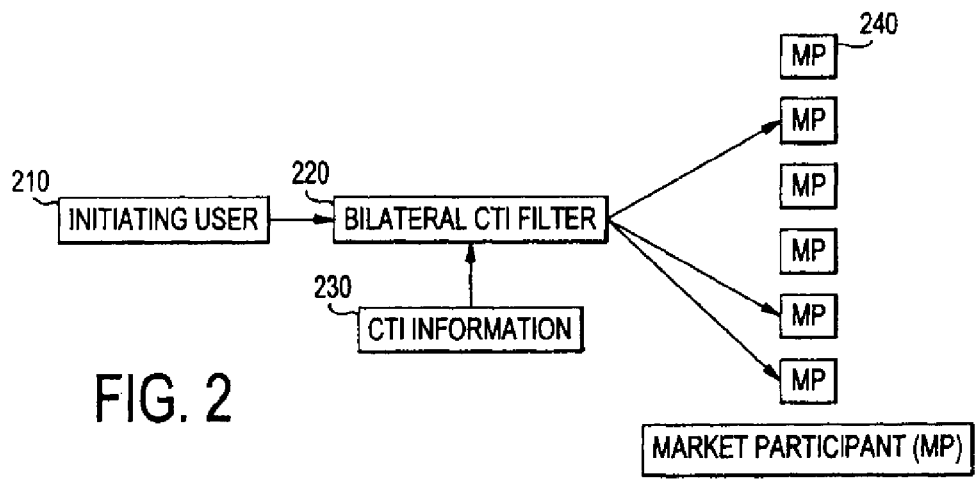
FIG. 2 is a schematic diagram depicting a preferred system for targeted dissemination of confidential information regarding trading interests.

The auction server 60 manages the process of accumulating market participant (MP) contra-orders in response to a CTI notification and executing a matching auction. In an alternate embodiment, there is no auction server and the CTI system functions as a targeted information dissemination mechanism. FIG. 2 depicts the information management function of a preferred embodiment of the subject invention. An initiating user 210 communicates to the CTI manager a trading interest and parameters that limit the dissemination of the information. The CTI manager uses these parameters and CTI information 230 to determine which market participants 240 should receive the information. Also, each MP communicates his own parameters to the CTI manager delineating the trading interest information that the MP desires to receive. The CTI manager therefore acts as a bilateral CTI information filter 220. It limits dissemination of the initiating user's confidential information to those MPs 240 for which (1) the MP fits the initiating user's dissemination parameters, and (2) the initiating interest fits the MP's notification parameters. In an alternate embodiment, the CTI manager is only a unilateral information filter in which the system targets MPs to notify but does not allow the MP to similarly filter notifications.

Comparing FIG. 1 and FIG. 2, in a preferred embodiment both the initiating user 210 and the market participants 240 are users 20 of the system, the bilateral CTI information filter 220 is the CTI manager 10, and the CTI information 230 is supplied by the external data sources 40 and the CTI user database.

Figure 3:
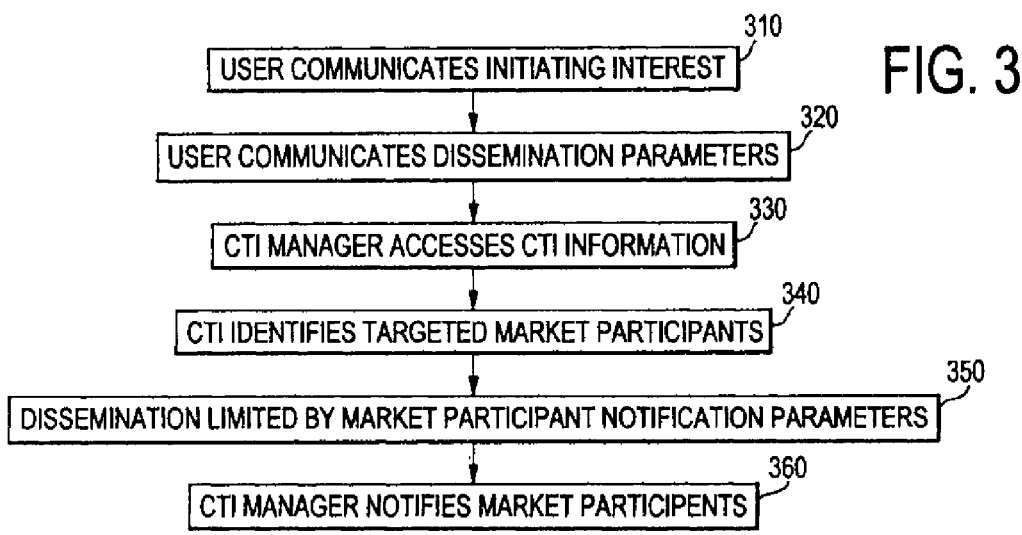
FIG. 3 is a flowchart illustrating steps of a preferred method of targeted dissemination of confidential information regarding trading interests.

FIG. 3 is a flow diagram of the operation of an information management function of a preferred embodiment. In step 310, a user communicates an initiating interest to the CTI manager. In the preferred embodiment, the initiating interest is a live executable order submitted to the CTI system to initiate an auction, but in alternate embodiments the initiating interest can be other information that the CTI system must then certify. For example, the user may wish to selectively disseminate the existence of a large executable order that a user has placed in another market or auction system such as an ECN or POSIT®. The user would submit information regarding the order, and the CTI system would then verify the existence of the claimed order, so that all market participants subsequently notified of the order can rely on the truthfulness of the dissemination. Similarly, the user can submit an indication of interest, which the system then certifies from verified information regarding current executable orders, recent trading history, and/or canceled orders which were once executable but were not filled. Once again, all market participants subsequently notified of the interest can rely on the truthfulness of the dissemination. In an alternate embodiment, the user can submit a non-certified trading interest, but this lack of certification is indicated to all market participants subsequently notified.

In a preferred embodiment, the initiating interest includes a price limit, which can be a nominal value (e.g., $112½) or pegged to a market price when the price is set (e.g., market midpoint set at the termination of the auction). Alternate embodiments enable the initiating user to peg the price limit to a yet-to-be-determined market value or index. For example, in an alternate embodiment the user can peg the price limit to the daily volume weighted average price (VWAP) as will be calculated at the end of the trading session. In the preferred embodiment, the initiating interest includes auction parameters such as the length of the period during which the CTI system is to accumulate responses from the market participants (the "accumulation period").

In step 320, the user communicates the desired dissemination parameters. In the preferred embodiment, there are many dissemination parameters available to the user, the most important being various measures of certified contra-interest. In the preferred embodiment, the user can specify certified contra-interest from (1) live executable orders; (2) past executed trades; or (3) canceled orders that were once executable but were not filled. Examples of CTI-based filtering of dissemination of an interest to buy 500,000 shares of a certain stock include limiting dissemination to (1) MPs or other system users presently offering 10,000 or more shares of that stock in the marketplace; (2) MPs or other system users who have sold over 25,000 shares of that stock in the current trading session; (3) MPs or other system users who have offered blocks of over 10,000 shares of that stock in the current trading session; or (4) MPs or other system users who have bought at or above the National market Best Offer in the current trading session. The quantities and time horizons in these parameters are all selectable by the user.

In a preferred embodiment, there are many other parameters available to the user that employ market information from the external data sources 40 and the CTI user database 50 to more accurately target dissemination to desired market participants. For example, the user can choose to notify only those market participants with certain response or initiation statistics (e.g., directing the CTI manager to notify only market participants who have responded to 10% of CTI notifications received in a certain time frame or to a certain total number of CTI notifications). In addition, the preferred embodiment enables the user to target MPs with certain known holdings in the security of interest. The preferred embodiment also enables users to exclude MPs from notification on the basis of their history of trade breaks (e.g., preventing CTI information from reaching any MP who has broken some quantity of trades in some period of time). The preferred embodiment also enables users to include or exclude specific MPs from notification by name or identification number.

In an alternate preferred embodiment, the user can also target MPs based on more sophisticated analysis performed by the CTI manager on the trading patterns of various users to identify certain correlations or patterns (e.g., buyer of technology stocks, sector rotation, etc.). In another preferred embodiment, the user can exclude MPs based on any identified inappropriate trading behavior such as front running and peg gaming stored in the CTI user database 50. In another alternate embodiment, the dissemination parameters are system-defined and not selectable by the user. In yet another alternate embodiment, the user can choose between defining some or all of the dissemination parameters and using system-defined default parameters. Preferred database queries and query mechanisms are discussed below in greater detail.

Referring back to FIG. 3, at step 330 the CTI manager accesses the necessary CTI information from the external data sources 40 and the CTI user database 50 to perform the CTI filtering analysis. At step 340, the CTI manager analyzes CTI information using the dissemination parameters and produces a list of MPs to notify. At step 350, the CTI manager further reduces the MP notification list using the MP notification parameters stored in the CTI user database 50. At step 360, the CTI manager sends notification of the confidential initiating CTI to those MPs for which (1) the MP fits the initiating user's dissemination parameters, and (2) the initiating interest fits the MP's notification parameters. In an alternate embodiment, the notification includes statistics regarding the initiating user's past auctions (e.g., proportion filled, cancel rate, frequency of trade breaks, etc.).

In an alternate preferred embodiment, after step 350 the initiating user is shown a summary of the results of this analysis and is given the option of modifying the dissemination parameters given in step 320 to more accurately tailor/limit the dissemination of confidential CTI. For example, a user can modify dissemination parameters that are too inclusive (e.g., too many MPs have sold 10,000 or more shares of the relevant security today) or exclusive (e.g., there are no MPs who currently have a live order to sell over 50,000 shares). The production of the MP notification list is an iterative process in this embodiment, as the embodiment repeats steps 330-350 until the user is satisfied with the output of the dissemination analysis. The user interaction in this iterative process is performed through interface means that are well known in the art.

In a further alternate embodiment, the adjustment is done by the system without sending information back to the recipient, based on adjustment rules set by the user beforehand. For example, if a user enters a query to find the buyers of more than 10,000 shares net during the past hour, but wishes to notify no more than 4 counterparties, this query request may be amended by a request to extend the time period to more than one hour if the number of contraparties found in the past hour was less than 4 or, in the opposite case, where more than four large buyers were found in the time period, by a request to reduce the time span of the query. A simple example of a self-adjusting query is one that seeks the most recent net buyer or seller of at least a given number of shares. If no one has accumulated a position of this size in a given time period, it would return the largest accumulator during said time period. This query will return exactly one counterparty, unless there have been no trades in the day, in which case the user would be notified that no counterparty could be identified for lack of trading data in that security. These examples of self-adjusting dissemination rules are intended for the purpose of illustration only and not as an exhaustive list; other self-adjusting dissemination rules will be apparent to those skilled in the art.

Figure 4:
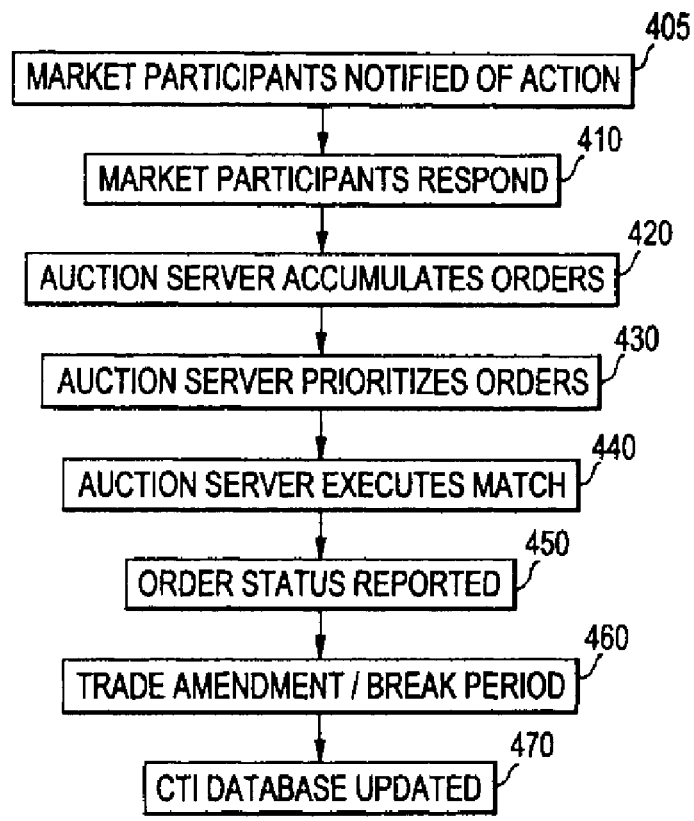
FIG. 4 is a flowchart showing steps of a preferred method of matching interests identified by targeted dissemination in an auction execution.

FIG. 4 is a flow diagram of the operation of the CTI management system in executing an auction based on the disseminated initiating interest. At step 405, notification of an auction initiated by a CTI is disseminated to MPs targeted in the process depicted in FIG. 3. At step 410, the notified MPs have the option of responding to the notification. In the preferred embodiment, this response is an executable price-limited contra-order sent to the auction server. As with the initiating interest, in the preferred embodiment the price limit can be either a nominal value or pegged to a market price. Alternate embodiments enable the responding MP to peg the price limit to a yet to be determined market value or index. For example, in an alternate embodiment the MP can peg the price limit to the end of day VWAP.

An alternate embodiment enables the notified MPs to simultaneously submit a trading interest and send a message to the initiating user to directly negotiate a trade. Another alternate embodiment enables the notified MPs to respond via a private chat session to directly negotiate a trade. Alternate preferred embodiments also enable the MP to respond in a semi-private negotiation chat session with the initiating user and some or all of the other notified MPs. The system provides the chat and messaging functionality using interactive communication technology as is well known in the art. Alternate preferred embodiments also provide the notified MPs with the initiating user's phone number and/or e-mail address to provide other channels of direct communication.

In step 420, the auction server 60 accumulates orders from the notified MPs. In the preferred embodiment, the duration of the accumulation period is set by the initiating user in the auction parameters communicated in step 310, subject to a system-defined minimum and maximum. This enables users of the CTI system to initiate auctions at any time and limit them to MPs with verified contra-interest, in sharp contrast with the POSIT® system in which users must wait for periodic matching sessions which are not targeted in any way. In alternate embodiments, there is a fixed, system-defined accumulation period. In another preferred embodiment, the system sets the end of the accumulation period, subject to a minimum and maximum. If possible, the system sets the end of the accumulation period to match the end of the accumulation period of any other pending auction so that the auctions can be combined to increase total liquidity. In the preferred embodiment, during the accumulation period, the initiating user and the notified MPs can modify or cancel their orders placed in the auction server. Alternate embodiments place restrictions on this ability. For example, an alternate embodiment does not permit the initiating user to cancel the auction after notified MPs have responded with contra-orders; the initiator is locked into the order once a MP has relied on it to respond with a contra-order.

In step 430, the auction server 60 of a preferred embodiment prioritizes the contra-orders sent by notified MPs. The preferred embodiment creates an execution priority by the following sequential rules:
1) Total matched size—Combinations of contra-orders are chosen which maximize total size executed.
2) Price limit—If competing MP contra-orders would produce equal matched quantities, the auction server will first execute MP contra-orders with more aggressive price limits.
3) Size limit—If competing MP contra-orders have the same (or no) price limit, the auction server will first execute orders with more aggressive size limits.
4) Time of entry—If competing MP contra-orders have the same size limit, the auction server will first execute orders entered earlier.

Alternate embodiments that employ different execution priority rules will be apparent to those skilled in the art. For example, one alternate embodiment ignores the size limit of the contra-order; in another alternate embodiment, where there are no price limits and actual execution is at the market midpoint at the moment of matching, execution priority is by time of entry.

The above description assumes that the initiating interest is the only order on one side, and all orders sent to the auction server by notified MPs are on the contra-side. It is possible that a notified MP responds with an order on the same side as the initiating interest, necessitating an execution priority for that side as well. In a preferred embodiment, the initiating interest has absolute execution priority over subsequent MP orders. This is an additional benefit of the CTI system from the initiating user's perspective. The system enables the initiating user to target dissemination of a confidential trading interest to MPs with a certified contra-interest, to influence the auction timing, and obtain priority in matching over contra-orders placed in response. All orders placed by notified MPs on the same side as the initiating interest are executed only after the initiating interest is filled, and according to the execution priority outlined above. Once again, alternate embodiments that employ different execution priority rules will be apparent to those skilled in the art. Furthermore, in an alternate embodiment, the initiating interest is not granted absolute priority over competing orders subsequently placed by notified MPs, and must compete according to the ordinary execution priority.

In another embodiment, more than one auction can be combined to pool liquidity. In a combined auction, each initiating interest is given exclusivity over contra-orders placed by notified MPs in response to that respective initiating order. By "exclusivity" it is meant that a contra-order placed in response to an initiating order cannot be matched with any other order until the initiating order is filled or canceled. In an alternate preferred embodiment, there is no priority or exclusivity granted to the initiating orders in a combined auction, and all orders compete according to the same execution priority. Alternate embodiments that employ other means of combining auctions will be apparent to those skilled in the art.

In step 440, the auction server executes the orders according to the execution priority set in step 430, all at a price set by the type of auction employed. If there are no MP responses or no trade is possible given the limit prices, the auction is unsuccessful and is terminated. In a preferred embodiment, the auction server employs a midpoint cross auction, where all orders are executed at market midpoint at a certain time. To avoid peg gaming, in the preferred embodiment the execution price is pegged to market at a random time during a ten minute "fuzz period" after the end of the accumulation period. In an alternate embodiment, there is no fuzz period and the auction execution price is determined at a known time after the end of the accumulation period.

In an alternate embodiment, there is no system-imposed accumulation period or fuzz, but the system offers randomly-timed match events, and users who initiate a transaction have the option to submit the corresponding response orders to an accumulation period to (1) create competitive bidding conditions; (2) expose their initiation order to immediate execution against response orders as they come in on a first-come-first-served basis; and/or (3) expose their initiation order to the above-mentioned random match-check events when such events take place. Preferably, the random match-check events are scheduled with a constant probability per unit of time. This result can be achieved with a computer by generating a pseudo-random number in the range (0,1) and setting the delay between one match-check event and the next equal to the logarithm of this pseudo-random number. The timing of the day's match-check events is stored in the system but is not disclosed to the users. Users who enter orders specify whether the order should (1) subject response orders to a holding period before they can match, for the purpose of generating competitive auction conditions; (2) expose the originating order to an immediate match-check event following the expiration of the holding period, if any; (3) expose the originating order to immediate execution against response orders on a first-come-first-served basis (following the expiration of the holding period, if there was one); or (4) expose the originating order to execute in randomly-timed match-check events.

For example, a user could use this system in the following ways: (1) to enter an order that will be exposed only to randomly-timed match-check events, removing the advantage of market timing for the contra party. (2) Enter an order that a notified party can execute at any time by entering a response order. This transaction gives the recipient the benefit of market timing, and may in return ask for a better price. Preferably, the notified parties are aware of these order-handling rules, so they know how their response order will be handled, and specifically, whether it will execute immediately or be placed on hold for a randomly-timed event. In a further alternate embodiment the system displays only the usual facts about the order and the order-handling rules remain hidden. In a still further alternate embodiment, the order is displayed as a passive order and executes immediately against contra orders at that price (such as the inside market best bid or best offer), but upgrades its price to the midpoint for possible crossing against similar orders on the contra side in the event of randomly-timed events where neither party has control of the execution time. In this hybrid embodiment, the value of the market timing option is displayed to the order recipient, allowing both market makers (liquidity providers for whom the market timing option is of most value) and "natural" contras seeking midpoint executions to participate, each in their natural manner. In an extension of the hybrid embodiment, the initiating order simply displays two prices, which do not have to be the inside market or midpoint prices but can be fixed limit prices or prices pegged relative to a market value such as the midpoint price minus $0.03; the more aggressive price is accessible only to respondents who are willing to renounce the market timing option by leaving their order on hold until the next match-check event.

Alternate embodiments employ various other auction types. For example, one alternate embodiment employs a "sealed envelope" auction where the limit price on all orders is kept confidential, and a single price is chosen to maximize the size of the matched execution. Another embodiment employs a "private outcry" auction where the initiating user and all notified MPs can see all orders and their limit prices as they accumulate, and there is price competition among the responding MPs to trade with the initiating interest. The examples given assume that all orders are executed at the same price; another alternate embodiment employs discriminatory pricing where all orders from responding MPs trade at their limit price. This list is not intended to be exhaustive, as alternate embodiments that employ different auction types will be apparent to those skilled in the art. An alternate embodiment enables the initiating user to choose from more than one different auction type such as those described above.

In step 450, the auction server informs the initiating user and all responding users of the status of their respective orders (i.e., "fill," "partial execution," "canceled," "open," "expired"). In step 460, the auction server of the preferred embodiment enables participants in the auction to communicate with each other and a system administrator to resolve any perceived errors. In a preferred embodiment this communication is via semi-private chat messaging, but alternate embodiments supply telephone contact information. Users can break the trade or negotiate an amendment during a temporary window, after which the trade is final. The use of this window represents a tradeoff between the interest in instant finality to trades and the interest in minimizing the costs and disruption caused by errors. An alternate preferred embodiment does not offer a temporary window to negotiate changes to the executed auction. In step 470, the CTI manager 10 processes the auction activity and updates the CTI user information database to reflect the initiation, response, execution, and trade break activity that took place.

In an alternate preferred embodiment, the auction server 60 also contains a depository of orders not related to an active auction. In this embodiment, any user can place an order in the depository without initiating an auction or invoking CTI targeted notification. These orders are dormant until an auction is initiated in that stock, at which time they are treated by the auction server as a response received from a notified MP in step 410. In an alternate embodiment, the auction server performs a match at periodic intervals without any CTI initiation to clear out the depository of dormant orders. An alternate embodiment performs these auctions only when sufficient dormant interest has accumulated, rather than at defined intervals. In yet another embodiment, these orders are not dormant and are continuously executable subject to their price limit, as in an ECN. Another embodiment enables live execution but with a price limit defined relative to an external price, such as the market midpoint or a certain spread to the end of day VWAP.

In an alternate embodiment, the user entering an order into the order depository can specify relevant order-handling rules. Examples include: (1) whether the order will be exposed to random match-check events; (2) whether it will be exposed to other orders being entered into the system as depository orders; (3) whether it will be exposed to orders with a CTI notification request attached (hereinafter "advertised orders"). In embodiments comprising an order depository, the user entering an advertised order can preferably also specify whether or not this order will be exposed to the incoming depository orders. By letting an order execute against an entered contra order immediately, as opposed to limiting this process to randomly-timed match events, the party entering an order is expressing the willingness to be "picked off" by a contra party who might be blindly probing the system to grab any available liquidity in light of newly released price-affecting news.

In an alternate embodiment, the system specifies order-handling rules that are fair for all participants, and advertises these rules for all to understand. Preferably, the advertised order is exposed to immediate execution against response orders—it is not exposed to immediate execution against orders submitted to the order depository, or against other initiation orders that are not responding to the notification of the advertised order. Response orders have a first chance to match against the corresponding initiators, and are eligible to match against any other order thereafter; depository orders are exposed only to random match-check events. In an alternate set of system-imposed order-handling rules, the initiator's order is only exposed to execute immediately against respondents who pay a more aggressive price; midpoint responses are stored until the next randomly-timed match-check event. This list of order-handling default rule-sets is intended only for the purpose of illustration; it is not intended to be exhaustive, and other order-handling default rule-sets will be apparent to those skilled in the art.

Notification on near misses: in an alternate embodiment, a user entering an order can request that a message be generated to notify any party who enters an order on the contra side that is close to matching but does not quite have the right price or sufficient size for a match. Preferably, the user specifies what price or size differential defines a "near miss." For example, such a definition might state that the price should be within $0.03 of the order's limit price and that the size should be no less than ½ of the order's minimum execution quantity, or that the second order's minimum quantity should be no greater than 1½ times the first order's size. This is an example of routing CTI messages (notifications of an order) based on CTI information (the fact that the second participant entered an order with nearly matching conditions).

In an alternate embodiment, the notification on near-misses is also available when the order has already been the subject of another notification, in which case a second notification event may take place regarding the same originating order. When a single order is subject to multiple notifications, the order-handling rules apply as they relate to the particular notification that the response is related to. For example, one notification may indicate that response orders would execute immediately on a first-come-first-served basis, while another notification of the same order would receive responses in a book to be considered in a random match-check event. In a hybrid notification, the respondent chooses to pay up for an immediate execution or wait for a better price by placing an order in the book and wait for a random match-check event.

In a further alternate preferred embodiment, there is no auction server or execution functionality, and the CTI system functions as the targeted information dissemination mechanism depicted in FIG. 2. In this alternate embodiment, after the notification process depicted in FIG. 3, the CTI system does not perform the auction process depicted in FIG. 4, but rather enables the notified MPs to respond to the initiating user via a private or semi-private negotiation chat session as described above. Alternate preferred embodiments also provide the notified MPs with the initiating user's phone number and/or e-mail address to provide other channels of direct communication. After the initiating interest expires or is canceled, the preferred embodiment updates the CTI user database to reflect the initiation and response activity.

In an alternate embodiment, a third-party matching facility, such as Optimark, uses the CTI system to drum up liquidity for a match, then executes the match. For example, a MP may send an order to Optimark and request that a notification be sent out announcing: "There is an order for DELL in Optimark for the next round; please participate." In this embodiment, there is no chat, but there is an address (in the example, Optimark's) where the match is to be executed.

In a further preferred embodiment, the CTI system functions in a manner roughly analogous to a rating service. In this embodiment, the system compares non-certified disseminations of trading activity (such as the disclosures on AutEx+®) to actual certified information, to generate a measure of the overall accuracy of market participants' disclosures. This accuracy rating can be used by other market participants to discriminate among the disclosures on the basis of demonstrated trustworthiness.

In another embodiment, the CTI system rates a market participant's compliance with the MP's own stated trading limits. For example, when a MP is negotiating a trade, in order to receive a better price the MP may agree to be bound to a trading cap, to demonstrate that the present order is not part of a much larger trading interest, and that the MP is not simultaneously negotiating similar trades with other MPs. The CTI system can compare the MP's stated trading limits to actual certified information, to generate a measure of the MP's demonstrated trustworthiness. This rating can be used by other MPs to accurately price the likelihood that a negotiated order is part of a much larger order.

In an alternate embodiment, service bureau functionality is based on a subsystem hosted by the DTCC [need definition], where queries are executed to confirm whether or not a given user has exceeded the stated cap on the number of shares to accumulate in the given day. In this embodiment the subsystem receives a data feed from an Institutional Delivery (ID) system containing information on the buy-side party that is involved in each trade. Preferably, the result of the query is not disclosed back to the system of the present invention, but only a Boolean (yes/no) descriptor of the party's compliance with stated trading cap is disclosed, upon permission by the institution concerned. Failure to permit said verification is handled in the same manner as a failure to comply with the trading cap: compliance statistics are reported to the trading counterparty in subsequent attempts to negotiate a trade using a trading cap.

In an alternate embodiment, the subsystem is not hosted by the DTCC, but by the first participant's custodian firm. In a further alternate embodiment, a large institutional custodian hosts the system. Custodians are another natural throttling point where the vast majority or all of a particular institution's trading data is available. In a further alternate embodiment, the system is permitted to execute queries against client institutions' order management systems, to verify that the trading caps are being respected. Preferably, this access can be permitted or denied, either system-wide or on each query request. As above in the case of access denial, said denial can be subsequently reported as part of compliance statistics.

In the above order management embodiment, participants are contractually bound to respect the integrity of the software that locally receives query requests and executes them against the OMS database, as well as to respect the integrity of the OMS database itself so that the information in said database accurately reflects the participant's executed trades. The contract can also include a right to have a third-party consulting firm inspect and verify compliance with said contractual terms. In a further alternate embodiment, a clearing firm hosts the system that executes queries against the trading data. This embodiment of the service bureau issues certificates on the voluntary compliance of their correspondents to stated trading limitations.

In a further embodiment, the CTI system monitors a MP's trading activity for correlation to inappropriate trading behavior, to generate a behavior rating. In this embodiment, the CTI system monitors MP activity for suspected front running. When the system becomes aware that a MP has been notified of a large trading interest (e.g., from an auction notification on the system or through a CTI disseminated over the system), the system monitors the subsequent trading activity of notified MPs to analyze correlation between their trading activity and the revealed CTI.

In another embodiment, the CTI system monitors MP activity for suspected peg gaming. The system monitors the trading activity of MPs participating in auctions (on the CTI system or on another system such as POSIT®) in which the price is set relative to a market price such as the midpoint. This trading activity is monitored for negative correlation to represented auction orders (e.g., MPs who sell while a buy order is represented in the auction), which indicates a possible attempt to manipulate the price of the auction execution. In another embodiment, the behavior rating also incorporates information regarding the MP's history of trade breaks.

In all of these "rating service" embodiments, the MP being rated permits the CTI system to use confidential information to rate the MP's past behavior (e.g., disclosures, trade breaks, inappropriate trading activity) in order to receive better prices on future trades or more order flow. This rating information is stored in the CTI user database 50 and can come in many forms, as will be apparent to one skilled in the art. Examples of ratings forms include numerical data (percent divergence between disclosed and actual trading activity or between stated trading cap and actual trading activity), boolean indicators (has the market participant exhibited inappropriate trading behavior or not), or scaled ratings (rating from 1 to n that incorporates information regarding various trading activity scaled according to, for example, recency and frequency of certain activity, degree of correlation to inappropriate behavior, etc.). These examples are not exhaustive, and many representations of the rating data will be apparent to those skilled in the art. In an alternate embodiment, an MP may request that a rating "certificate" be provided to a potential counterparty, to demonstrate to the counterparty the trustworthiness of the MP. The certificate is a certified report based on the MP's market behavior history.

These embodiments provide the described "rating service" function in addition to the auction and execution functionality described in FIG. 4; the ratings can also be used as a dissemination parameter in these embodiments. Alternate embodiments that provide the rating function do not offer the execution functionality and operate as the targeted information dissemination mechanism depicted in FIG. 2; the ratings can be used as a dissemination parameter in these embodiments as well. Other embodiments simply operate as a certification and rating system, and do not offer execution or targeted dissemination functionality. Preferably, the previously described rating supports additional functionality for users to determine whom they wish to notify of their orders. The system does not notify users of said statistics on the analysis of front-running activity by other MPs, but users are aware of which statistical parameters are maintained in the system and can set their own conditions to avoid notifying parties whose past trading statistics indicate a high likelihood of front-running activity, or any of the other ratings described above.

For example, users are able to exclude from notifications any user for which adverse price impact followed receipt of a notification in at least 65% of the cases and where the sample set contained at least 10 previous notifications. In an alternate embodiment, the system has a disclosed rating equation that produces a single no-front-running target quality indicator (a number from 0 to 10) and users choose the minimal number that will be required for a recipient to receive a notification. In an exemplary implementation, this quality indicator is equal to 10 minus the number of times in the last 10 notification events adverse price movement of less than $0.1 followed the notification in the subsequent 5 minutes, minus twice the number of cases where said adverse impact was greater than $0.1, plus the number of times the price impact was favorable to the originator of a notification, or 10 if the above calculation gave a result greater than 10. Other implementations of a system-defined rating system will be apparent to those skilled in the art.

In another alternate embodiment, the rating follows from an equation that is not disclosed to the parties, and is subject to being modified without notice, so that it becomes impossible for users to find loopholes allowing them to front-run with impunity by occasionally acting in a way that will increase their score though an understanding of the scoring algorithm.

In all of these embodiments, Market Participants agree to submit their trading data to this analysis or renounce the opportunity to receive notifications from initiators that include a no-front-running scoring requirement in their notification parameters. In an alternate embodiment, the agreement is not required on a case-by-case basis but instead the agreement to submit data for front-running analysis is part of the general agreement to use the system.

In an alternate embodiment there is no equation giving a score but the rating is replaced by a simpler "penalty box" mechanism. In this embodiment, users who receive notifications of an order of at least 100 shares displayed and do not enter a response order for at least the lesser of 1000 shares or the received order size will be marked as "uninterested" in that symbol and side and therefore ineligible to receive further notifications during a 30-minute period. A user can reaffirm his or her interest in trading this symbol and side by entering an order for at least 1000 shares with notification parameters chosen so that at least one other party is included in the dissemination list—thereby creating a genuine liability.

In an alternate embodiment the originator of a notification can decide whether a penalty box should be applicable (to exclude from potential notification recipients who have recently failed to respond), and may include the penalty box duration (other than the 30-minute default value) and the minimum size required to be placed in the penalty box (or to leave the penalty box by entering an order), as part of the dissemination parameters.

A further embodiment of the subject invention is directed to order routing and order management based on CTI information. One element that differentiates the subject invention from other systems and methods is its use of confidential information on a one-way basis: MPs supply confidential information to a preferred system in order to attract trading interest notifications; this confidential information is never released to other MPs.

Current order routing and management systems are based on public information only—for example, Tradescape will route an order to Instinet if Instinet is currently showing the best price, and offers faster executions than other MPs (such as Market Makers that implicitly guarantee the same price)—but Tradescape does not know whether or not this best-priced order on Instinet has a large reserve size. In a preferred embodiment of the subject invention, Instinet sends its client's reserve size information confidentially, knowing that the only usage made of that data will be to send a large-sized order that can hit the reserve size if the opportunity comes up. Other sources of confidential information, besides reserve size information, would include the data on clients' past trading activity, and other CTI information sources, including those described elsewhere in this description.

Figure 5:
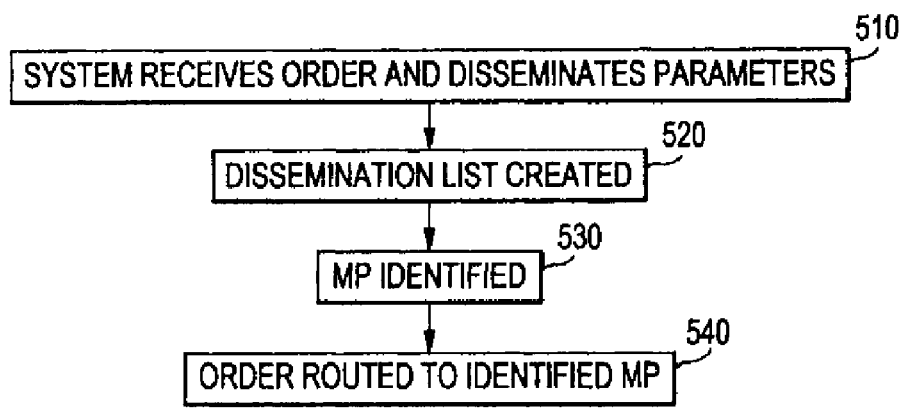
FIG. 5 is a flowchart showing steps of a preferred order routing embodiment.

An order routing embodiment is disclosed in FIG. 5. At step 510 the system receives an order and dissemination parameters. At step 520, it creates a dissemination list as described above, and at step 530 ranks the market participants on the dissemination list and identifies the market participant that is the most likely to take the contra side to the trade. At step 540, the order is routed to the identified MP.

There are several ways to rank market participants, depending on the CTI information. The ranking rules can be any one or an ordered combination of the following:

First, by size: if the MP's CTI information comprises orders, then the MPs will be ranked according to the size of these orders; if the CTI information comprises trades executed in the recent past, the system will rank MPs by total net size traded in the past N minutes (buys minus sells), or by gross traded volume (buys plus sells): for routing a sell order, larger net or gross buyers are ranked higher than smaller ones, while for buy orders the system will rank large net sellers or total amount traded ahead of smaller players. For example, if a user specifies dissemination parameters that seek to notify the 10 biggest net buyers during the past 2 hours, the system will execute a query to return a ranked list containing the 10 market participants that have accumulated the largest net quantities of stock during that time interval.

Second, by price aggression: the price aggression is the price of the order or trade, relative to the bid ask spread. Let B denote the best bid on the National Market, A the best offer and P the price of the order or trade, then the aggression X is given by $X=(P-B)/(A-B)$ for buys, and $X=(A-P)/(A-B)$ for sells. Higher price aggression levels will be ranked ahead of less aggressive orders or trades.

Third, by time: route the order preferably to MPs that executed the trade most recently.

A preferred order routing service preferably combines several of these criteria to break possible ties. For example, the system could route an order to the largest recent buyer in the last 30 minutes, choosing the most recent execution in the event of a tie. Other ranking rules will be apparent to those skilled in the art.

An order management embodiment of this invention is an extension of the order routing system described above. In this embodiment, the system first routes the order to the top-ranked participant, as described above. If the order is not executed, the system then routes the order to the next-most-likely contra in the ranked list of market participants. This process is iterated until either the order gets executed, or a user-specified limit is reached on the maximum number of MPs that can be notified.

Figure 6:
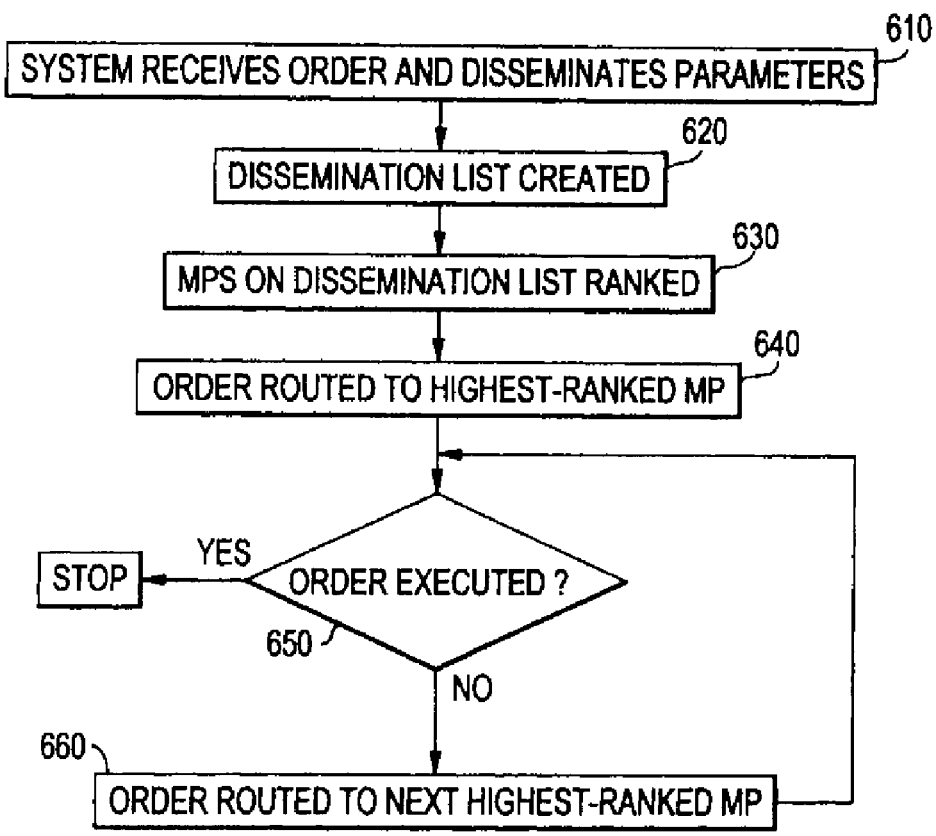
FIG. 6 is a flowchart showing steps of a preferred order management embodiment.

A preferred embodiment of the order management implementation is shown in FIG. 6. The system receives at step 610 an order and dissemination parameters. At step 620 a dissemination list is created, and at step 630 the MPs on the dissemination list are ranked as outlined above. For example, a user requests the system to query the trade database for the top 10 biggest buyers of DELL in the past 15 minutes, ranked by total net number of shares purchased, and in the case of a tie, choosing the one with the most recent trade. The system then receives the order electronically, stores the order, and at steps 640-660 works the order with the ranked dissemination list. At step 640, it routs the order to the highest-ranked MP and at step 650 it tests whether the order has been executed. If the order has not been executed or if the order has received a partial fill but has not been completely executed, the system calculates the residual quantity and proceeds at step 660 by routing orders for that residual quantity until the order is completely filled or the list of 10 MPs is exhausted.

Alternatively, a user may have an order sitting passively in the order depository (discussed above), and decide to "market" the order by initiating the order management process described above, for example by sending it to the ten most likely contras in ranked order.

In an alternate embodiment, a user can send parts of an order out to third-party systems and leave the remainder in the matching book, exposed to order entry events and/or random match-check events, as previously described. The aggregate size of the orders that are routed away from the system (hereinafter "exported quantity") preferably does not exceed the size of the order itself, so as to avoid a multiple liability problem wherein more shares could be executed than the order was good for. Preferably, the system is an open platform allowing third parties to advertise their own routing alternatives, and users can choose to "export" size to a combination of possible execution options.

In an alternate embodiment, routing options include the above-mentioned order routing embodiment that uses CTI information to intelligently route orders to likely contras, and other order routing embodiments that will be described below. In an alternate embodiment only the CTI-based routing options described herein are made available. When a routed-out order is declined by the counterparty or its time-in-force expires, the exported quantity attribute on the order in the system book is decremented to reflect the fact that this liability has vanished. In an extension of this embodiment, the user is allowed to enter a script through a Graphical User Interface (GUI) specifying the sequence of operations that should be executed in the process of "working" the order, including (possibly multiple) notifications with specific dissemination parameters. Order routing events where part or all of the order are sent to parties likely to execute said order parts, and the time interval allotted for completion of each instruction in the script, are specified by the user.

To enable the writing of such order management scripts, a GUI preferably offers the user a script-editing screen displaying a blank horizontal field with a downward-pointing arrow. Upon clicking on the arrow a drop list of order management options ("notify . . . "; "route to . . . "; etc.) is displayed. Upon selecting an item from this list, the user enters a dialog to edit the relevant dissemination parameters. Default values for the parameters are offered for convenience, but can be modified as needed by the user. When the user has completed the step of specifying dissemination and order-handling rules for one step of the script, he selects the time that will be allotted for execution of this step and presses an "OK" button, at which point the order management script is incremented with the just-specified order management instruction and a new blank horizontal line is displayed at the higher-level script-editing screen, with a downward-pointing arrow.

The user may again click on the arrow to select a new order management tool, enter a dialog to specify the second order management instruction and save it by pressing OK, having created at this point a script containing two consecutive order management steps that will be executed consecutively. By iterating this process the user can spell out a complete order management strategy. Having done this, the user subsequently submits the order with the attached order management strategy. The system stores the order parameters as well as the order management script, sets a timer to release messages that will trigger the beginning and end of each step in the order management strategy, and carries on with the sequential execution of each step as described in detail in other sections herein. Execution of order management instructions that require routing the order or parts thereof to third parties must be implemented through interfaces to said third party systems, using techniques and communication methods that are known in the art.

In an alternate embodiment, the confidential data that is used to create dissemination lists includes data on the past behavior of MPs following the delivery of CTI Notifications. In this embodiment, Market Participants must first agree to let other users request that custom queries and analytic calculations be executed on this confidential data to determine whether the MPs past behavior indicates a good track record of responding to notifications rather than front-running on the information. The only effect of permitting this access to an MP's confidential data is that the MP will then get a chance to receive more information, in the form of CTI Notifications. For example, a relatively small broker-dealer may rarely have the size to rank among the "top 10 buyers," but may respond affirmatively to CTI Notifications in almost all cases. Such a user would permit his past responding data to be analyzed, and thereby attract more CTI Notifications from users targeting MPs with a good track record in the system.

In this embodiment the user is allowed to enter an executable algorithm that will access the past usage data from participating MPs, and produce as output a ranked list of target MPs. The past usage data that is exposed to such algorithms comprises, for each participating MP, a list of past notification events comprising, in each case: (1) the size displayed in the notification; (2) the reason the MP was targeted (for example, bought 15000 shares during the past 30 minutes); (3) the MP's response (none, response order smaller than displayed size, equal to, or greater than displayed size); and (4) the price fluctuation following the notification event.

Users can combine the usage of the trade database and the past behavior database by entering requests for queries that combine information from both. For example, a user may enter dissemination parameters that specify that the notification should be sent to: the 10 biggest buyers excluding those that have received notifications in the past and never entered a response order.

In an alternate implementation users enter algorithms that access all available data, including the CTI information database and the past usage database, and attempt to estimate based on this data the probability that any one MP would execute their order. They then either send notifications to the most likely contras, or draw on the order management function to route their order to the ranked list of most likely contras until either the order is filled or the list is exhausted. This embodiment requires an "analytic toolkit" (discussed below) to determine the probability of a match from data including CTI information and past events. The system allows users to submit their own custom tools, or to propose a "generic" probability-reconstructing tool (described below).

The probability that a MP in the dissemination list would execute an order can be calculated from data on how similar order routing events have unfolded in the past. This is required (1) when some MPs have been included in the dissemination list due to information on orders while others are in the list due to information on trades, so that there is no single comparable number that can be used to rank one relative to the other, and (2) when the MPs differ significantly in how they respond to notifications. For example if an institutional desk such as RSSF has been a net buyer in the past hour, it is likely to continue to buy, but if a retail Market Maker such as NITE has been a net buyer, it may need to reverse course and return to a neutral inventory position—so that would not be such a good target for a sell order. Another example of case (2) is one where an order is routed based on displayed size: again, different MPs will react differently to an oversized order. Orders displayed in institutional ECNs such as Instinet are more likely to have reserve size than retail-centric ECNs, and different Nasdaq Market Makers will have different rules on when to accept non-liability orders. In both cases (1) and (2), the system relies on a database of past events where orders were routed to given MPs and either executed (in part or in whole) or rejected. The probability of execution can be estimated from this statistical sample-set using a statistical estimator method that is described below. If there is not enough past data on a given MP to compute the probability of execution, the MP is assumed to behave like the average MP and data from all MPs is used to determine the "generic" probability of execution, which is then used to rank this MP in the dissemination list.

The first case to consider is that where a MP provides information on an order to buy $s_o$ shares of stock, and the task is to determine the probability that this MP would execute a larger order for $s > s_o$ shares. The probability of execution of an order of size $s > s_o$, where $s_o$ is the displayed size, can be calculated for individual Market Participants based on their response to past orders, using a statistical estimator approach, as described next. The probability function is assumed to be well-approximated by a generic parametric function such as $$P\left(1; \frac{s-s_o}{s_o}\right) = \frac{a}{1 + b\left(\frac{s-s_o}{s_o}\right)^\gamma},$$

that fits well to the distribution of trade sizes as can be observed in publicly-available data. The parameters a, b, and $\gamma$ are determined using an empirical approach and a sample-set of past order-routing events, by maximizing the probability of the sample-set. Each sample in the set comprises an order size s, a displayed order size $s_o$, and a bit (0 or 1) specifying whether the order was accepted (1) or only received a partial fill equal to the known size $s_o$ (0). Relatively infrequent events such as race conditions where the executed size is neither $s_o$ nor s are discarded from the sample-set for simplicity. If we call $\xi_n = (0$ or 1) the rejection (0) or acceptance (1) of the oversized order in sample number n, $$x_n = \frac{s_n - s_o}{s_o},$$

the probability of the sample set is $$P[\text{sample set}] = \prod_{\{n|\xi_n=1\}} P(1; x_n) \prod_{\{n|\xi_n=0\}} P(0; x_n)$$

This probability is greatest when the derivatives of log(P) with respect to each of the three parameters are equal to zero, namely when $$F_1 \equiv \sum_{\{n|\xi_n=0\}} \frac{1}{\alpha - 1 + \beta x_n^\gamma} - \sum_n \frac{1}{\alpha + \beta x^\gamma} = 0$$

$$F_2 \equiv \sum_{\{n|\xi_n=0\}} \frac{x_n^\gamma}{\alpha - 1 + \beta x_n^\gamma} - \sum_n \frac{x_n^\gamma}{\alpha + \beta x^\gamma} = 0$$

$$F_3 \equiv \sum_{\{n|\xi_n=0\}} \frac{x_n^\gamma \log(x_n)}{\alpha - 1 + \beta x_n^\gamma} - \sum_n \frac{x_n^\gamma \log(x_n)}{\alpha + \beta x^\gamma} = 0,$$

-continued where $\alpha = \frac{1}{a}$ and $\beta = \frac{b}{a}$.

The solution of this set of three non-linear equations can be found using methods known in the art, such as the Newton-Raphson algorithm [Numerical Recipes in C; Cambridge University Press 1988, 1992; pp. 379]. An initial approximate solution is required for this algorithm to converge: to obtain an approximate initial value of the exponent $\gamma_o$, we represent the available data in a histogram format, using logarithmic x and y axes, and determine the asymptotic slope of this graph for large values of x. The value of this asymptotic slope is then equal to $-\gamma_o$. Given this approximate value of the exponent, approximate values $\alpha_o$ and $\beta_o$ are obtained analytically by least-squares approximation. The Newton-Raphson algorithm can then be used to find a better approximation of the solution. This algorithm converges quadratically.

The second case is that where the CTI information that was used to place a MP on the dissemination list was trade information. In that case one first determines the total number of shares bought (sold) by that MP in the past interval of time, calling this number once again $s_o$. Usually the order to be delivered would be for a smaller number of shares, but that is not required. Once again the system uses a database of past events to reconstruct the parametric probability distribution, and to determine the values of the parameters that maximize the probability of the sample-set. In this case, there are three possible outcomes to consider in an order routing event: as before, the order can be partially executed ($\xi_n=0$) or filled ($\xi_n=1$), but also, in this case, since the MP has no open order, it is possible that the order could be rejected altogether. We will represent this possibility by the value $\xi_n=*$:

$$P[\text{sample set}] = \prod_{\{n|\xi_n=1\}} P(1; x_n) \prod_{\{n|\xi_n=0\}} P(0; x_n) \prod_{\{n|\xi_n=*\}} P(*; x_n)$$

where now $$x_n = \frac{s_n}{s_o} \text{ and } P(1; x), P(0; x) = \frac{a_0}{1 + bx^\gamma}, P(*; x) = 1 - P(0; x) - P(1; x).$$

Once again the probability is maximized when the partial derivatives of log(P) are equal to zero, leading to the set of four non-linear equations:

$$G_1 \equiv \frac{N_1}{a_1} - \sum_{\{n|\xi_n=*\}} \frac{1}{1 - a_0 - a_1 + bx_n^\gamma} = 0$$

$$G_2 \equiv \frac{N_0}{a_0} - \sum_{\{n|\xi_n=*\}} \frac{1}{1 - a_0 - a_1 + bx_n^\gamma} = 0$$

$$G_3 \equiv \sum_{\{n|\xi_n=*\}} \frac{x_n^\gamma}{1 - a_0 - a_1 + bx_n^\gamma} - \sum_n \frac{x_n^\gamma}{1 + bx^\gamma} = 0$$

$$G_4 \equiv \sum_{\{n|\xi_n=*\}} \frac{x_n^\gamma \log(x)}{1 - a_0 - a_1 + bx_n^\gamma} - \sum_n \frac{x_n^\gamma \log(x)}{1 + bx^\gamma} = 0,$$

where $N_0$ and $N_1$ are the number of samples where the order was partly executed and filled, respectively. The first two equations yield $$a_1 = a_0 \frac{N_1}{N_0};$$

this value of the parameter $a_1$ can be substituted in equations $G_2$, $G_3$, and $G_4$, to obtain three coupled non-linear equations that can be solved as described above using the Newton-Raphson algorithm or other methods known in the art. Given a numerical estimate of the probability of an execution, MPs in the dissemination list are ranked by placing the one with the greatest probability of execution on top of the list, then the one with the next greatest probability of execution in the second-ranked place, etc.

A preferred system also monitors the price fluctuation following order delivery to a market center, and identifies any statistically significant correlations between the order delivery event and subsequent price fluctuation on the market, separating the three cases where the order was executed in whole, executed in part, or rejected. This information is then taken into account in creating a ranked dissemination list, to avoid sending the order to MPs that have a pattern of trading ahead of a large order or leaking information that would allow others to do so, in both cases causing significant adverse market impact.

In a preferred implementation, users are allowed to specify the algorithm that seeks to detect MPs that cause adverse market impact and insert this into their request to create the dissemination list. For example, a user may first query the database for the list of MPs that permit access to their past behavior data. Where such data confirms that they have not been associated with a statistically-significant adverse market impact in the past, the user can then create a final dissemination list from a CTI database query that restricts the search to the MPs from the good behavior list. For example, the query might seek the 10 biggest buyers among the MPs that do not have adverse market impact. In another example the CTI query would be executed without consideration of good behavior, but the ranking is modified using the market impact information to lower the rank of MPs that have the strongest correlation with adverse price movement. There are two cases where market impact can be relevant: when an MP rejects an order, and when the MP accepts the order but price subsequently moves in a direction that will make further orders more expensive to trade. The latter case is expected and is the normal reaction of the market to the removal of liquidity on one side, but the effect can be exaggerated if the MP either leaks information or "rides along" with the institutional client, by taking a proprietary position in anticipation that the institutional client will continue to work the position on the market. In a preferred implementation, the average price impact of an order delivery to a specific MP is calculated separately for these two cases. If the party entering the order is placing a single order, then the only relevant market impact is that which occurs when the MP does not execute the order. But when the order entry party intends to continue to work the position, the relevant market impact is the weighted (by the probability of execution) average of the market impact when the order is or is not executed, as calculated above.

Figure 7:
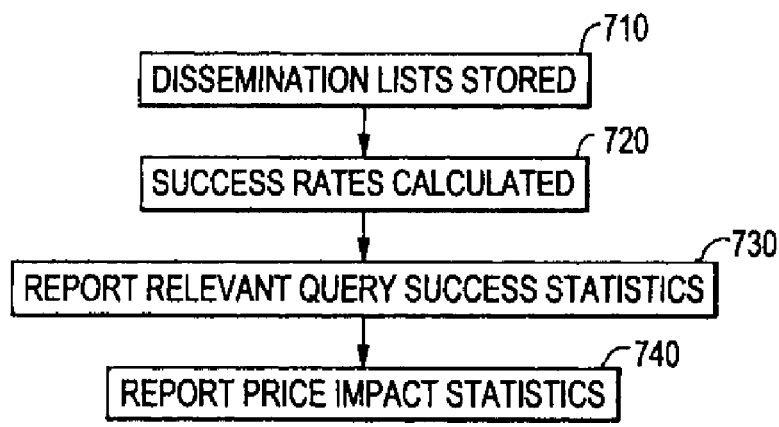
FIG. 7 is a flowchart showing steps of a certified trading interest query ranking embodiment.

A further embodiment shown in FIG. 7 is directed to ranking CTI queries. This embodiment provides a service that derives from the CTI notification system discussed above. Dissemination lists are created from queries in the CTI information database, as for example when searching for the largest buyers of DELL in the past 40 minutes. The preferred system stores these lists at step 710 and at step 720 calculates success rates for CTI notifications based on standard queries.

At step 730, for a given query, the system reports to a user on the relevant statistics. For example, a user planning to launch a CTI notification to sell 10,000 shares of DELL to the 10 largest DELL buyers during the past T minutes could view the success rate of this type of query in the past for time windows of T=10, 20, or 40 minutes. This will allow users to optimize the choice of time window: if the time is too short, the 10 largest buyers might include some small traders; if it is too long, it might include large buyers who are no longer actively buying the stock.

A further embodiment looks not only at the probability of execution but the average and root mean square of the price fluctuation in a two-minute period following the CTI notification and at step 740 reports this information to a user posting a similar query. CTI queries that lead to excessively large dissemination lists, or dissemination lists that include front runners more than natural contras, will be associated with statistically significant price impact.

SelectNet embodiment: an alternate embodiment of the subject invention enables the deployment of the order routing and targeted notification system within existing communication and trade execution mechanisms of an exchange or ECN. Although the description below refers to the Nasdaq SelectNet system it will be apparent to those skilled in the art that the same invention can be deployed in other exchanges, markets or ECNs with appropriate changes in the communication protocols. SelectNet allows Nasdaq Market Participants (sell-side firms) to route orders to other market participants or "MPIDs" via so-called "preferenced" orders. In the SelectNet embodiment the system has a separate MPID. When a user sends a preferenced order to this MPID, the system will execute a query against a confidential database, as described previously, to determine which other MPID is most likely to take the contra to that order. It then issues a new preferenced SelectNet order to this second MPID. For illustration purposes we will assume that the originating party's MPID is AAAA, the system is given the MPID SSSS and the target's MPID is BBBB. The first participant (AAAA) will issue an order preferenced to SSSS, following which SSSS executes a query against the CTI information database and determines that the optimum recipient for this order is BBBB. SSSS then issues a preferenced order to BBBB. If BBBB chooses to accept (execute) this order, SSSS in turn attempts to execute the order entered by AAAA. When both orders have been successfully executed, the system (SSSS) issues a message containing the details of the trade such as price, side of each party, etc. This message locks in the trade and triggers the clearing process. In this embodiment there is a possibility of a race condition wherein AAAA had issued a cancel request message at the same time that BBBB had executed the order. This creates a possibility of SSSS being left with a liability with BBBB that does not match a negating liability with AAAA, so the execution from BBBB cannot be processed until the market has been successfully notified that AAAA's order is matched and not cancelable. This new difficulty arises because a market negotiation system (in this case SelectNet) normally does not contemplate the possibility of an intermediary entering an order on behalf of another party where said intermediary does not accept liability for the order. The normal workflow of a market is one wherein a party entering an order is liable for the order, independently of whether another order has been previously entered by another party (here, AAAA). To link the two legs of the trade into a single transaction, the market systems must be modified so that messages that would lead to processing of the first leg of the trade are suppressed until the second leg of the trade can be executed. An enabling solution is described next. Preferably, the market's normal processing is modified so that the first execution message received from BBBB does not trigger an execution confirm message back to BBBB or the corresponding clearing report that would otherwise have locked in that trade for clearing. Instead, only the execution message notifying SSSS of the execution by BBBB is allowed to proceed. SSSS then executes the originator's order, whereupon once again the market system modification suppresses notification of the execution to AAAA and clearing, leaving only the execution confirm message back to SSSS. At this point neither AAAA or BBBB are able to cancel their orders, since both have been executed as far as the market system is concerned. Upon receipt of the second execution SSSS triggers a trade report that locks in the trade for clearing purposes. Preferably, the anonymity is maintained permanently by having SSSS intermediate the transaction in the same way as an agency broker would intermediate a transaction between two other brokers without the benefit of a spread. So both AAAA and BBBB are trading with SSSS, and the trade will clear as two trades where SSSS's clearing responsibilities net to zero.

In an alternate embodiment, SSSS is not a central counterparty but the clearing processes are modified to maintain anonymity until the end of the day or some other specified future time, by masking the counterparty field in all messages to the participants and their clearing firms. In a further alternate embodiment the preferenced order still appears as an order from SSSS so that the recipient does not know that it came from AAAA, but anonymity is not imposed after the trade and both parties discover whom they traded with immediately after an execution. In yet another alternate embodiment the targeted preferenced order to BBBB displays the originator's MPID, in which case the system is in effect a targeted quotation system allowing Nasdaq Market Participants to quote more aggressively than they would be able to on an open system, by targeting said aggressive quote to parties they believe are more likely to trade than to front run on their trading interest information. In all of these embodiments, an optional message field available for traders to comment their orders can be used to specify dissemination parameters that differ from a default routing system. Preferably, the default routing will look for the most recent net buyer or seller of at least as many shares as in the originator's order (if the originator's order is to sell 2000 shares, for example, the system will look for the most recent net buyer of 2000 shares).

In an alternate embodiment, a lower bound is set on the query size so that smaller orders do not end up being targeted at random to the most recent execution, but instead accurately target a party interested in accumulating the security. For example, a minimal query size of 5000 shares is generally sufficient to select out Market Makers with random fluctuations in their inventory. In this case, a 2000-share order would be routed to the most recent buyer of 5000 shares, while a 10,000-share order would be routed to the most recent net buyer of 10,000 shares. The user is able to reduce this default query size by inserting a key and parameter in the message field on the order. For example, the three characters Q3M indicate that the query should look for the most recent buyer (or seller) of at least 3,000 shares. Another use of the message field associated with an order is as follows. An order for 20,000 shares with the key "D10M" in the text message field would indicate that SSSS should route an order preferenced to the optimal target for 10,000 shares, instead of 20,000. The recipient (BBBB) can counter with a greater size that would execute against the originator's order (for example, 25,000 shares) and may get an execution back for more than the size of the SSSS-to-BBBB order. Although this functionality may appear similar from the user's perspective to the reserve size orders that ECNs make available, the ECN implementation of reserve size does not enable its implementation within an order routing facility such as Nasdaq's SelectNet where the an order is delivered for execution and is not held in a "matching book."

In a further enhancement, the originator can also enter the characters N3 indicating that the order should be routed not to one, but to three most likely contras (three most recent net buyers or sellers of at least as many shares as in the recipient's order). In this case, it is possible that multiple contras will respond to the order, and the sum of routed orders can comprise more shares than the originating order. When the whole size of the originating order has been consumed, the remaining recipient orders are canceled. If the last execution would overdraw the available size, then the execution size will be reduced to that which completely fills the originating order. When there is residual size from a counter or a multi-party execution the system generates a new order to AAAA, which appears as a new originating order from BBBB routed through SSSS.

In an alternate embodiment, the excess size of BBBB's order is simply declined. In the event of a race condition where the recipient had executed the order at about the same time as the cancel message was sent out, the execution is rejected. Another option lets users enter the characters "*69" in the message field, in which case the order will be routed to the most recent contraparty in an executed trade with the originator. This allows one to continue working an order anonymously with the same counterparty, rather than implementing a new database query and risking notifying multiple parties of the trading interest. Another option permits the users to enter the characters "$02" indicating that the price to be delivered to BBBB should be $0.02 less aggressive than the price of AAAA's order. When this feature is used, BBBB is expected to respond with a counter for a possibly different price. SSSS will then compare the counter price to AAAA's entered price and execute both orders at the counter price if the orders match.

In the preferred SelectNet embodiment, the message field entered by the originator is stripped out of the order sent to BBBB, so that BBBB cannot see the dissemination parameters used. In an alternate embodiment, the order to BBBB contains only those parts of the message field that are recognized as valid dissemination instructions, except the number following the $ sign in the case of price discretion orders. In a further alternate embodiment, the entire message field entered by the originator is forwarded to BBBB. Note that this embodiment is not consistent with enforcing anonymity since the originator may then choose to display his MPID in the message field.

In an alternate embodiment of the SelectNet implementation, the system is a midpoint execution system recognized as such through its MPID, which for illustration purposes we will take to be MMMM instead of SSSS. In contrast to the above description, the system will generally not execute at the price entered by either party. Instead, all parties are previously informed that MMMM will only execute orders at the midpoint price. The originator is therefore comfortable to send in an aggressive price, knowing that it will be interpreted as a cap on how far the midpoint price may drift, beyond which he would no longer be interested in carrying on with the trade. MMMM receives the originator order, executes a query as above to determine the most likely contra(s), and sends a preferenced order to the target (BBBB). In contrast to the previous embodiment, however, the price of the order to BBBB is not the same as the price cap on the originator's order. Instead, the order to BBBB is priced passively (less aggressive than the midpoint price; BBBB can accept the order at this price (which is an aggressive price from BBBB's perspective) knowing that this new price will be considered only as a limit on how far the midpoint is allowed to drift before BBBB ceases to be interested in completing the midpoint trade.

Upon receiving the execution from BBBB, MMMM corrects the price to the current midpoint and awards both the originator and the recipient price improvement over their stated limits. In doing so, MMMM is modifying the price on BBBB's execution of the order. This is possible because, as above, BBBB's execution is not locked-in until it has been confirmed by the market system. In the present embodiment, the confirmation of BBBB's execution is suppressed and instead a later execution message is sent to BBBB with the better price. Since the execution message coming from the market is the legally binding version of the trade, BBBB's systems are set up to key off the fields in this latter execution message, and therefore will incorporate the improved price in its P&L sheets, as well as in clearing support systems. Although the SelectNet embodiment is described in terms that enable its implementation in the Nasdaq Stock Market, it will be clear to those skilled in the art that the same systems and methods can be deployed in other exchanges with electronic order routing and display, via adaptation to the appropriate messaging protocols.

The existence of the market-deployed embodiment enables an important enhancement of the auction server embodiment of the subject invention. In this enhanced version of the auction server, users enter dissemination parameters indicating that they would like to draw response orders from sell-side firms (such as Nasdaq Market Participants). A user specifies the parameters mentioned above for the SelectNet embodiment, including the number of sell-side firms to be targeted, the displayed quantity, "*69," and other above-mentioned options. The auction system will then route preferenced orders to SSSS with a very passive price, such as $0.01 for a buy order, indicating that a counter-offer is expected. This very passive targeted order is in effect a targeted "Request For Quote" (RFQ) announcing the initiator's auction. In this case, the originator of the SelectNet preferenced order, AAAA, is the market participant hosting the auction. Through marketing means, AAAA will let it be known that orders for this specified very passive price should be handled by sending a new preferenced order to AAAA containing BBBB's true limit price, as if this were the response order into the auction hosted by AAAA. If this new order matches the initiator's conditions, AAAA will execute the new order coming through the market system. In an alternate embodiment, the market system is used only to issue the RFQ and the recipient can respond through a separate communication channel. In that case, the purpose of the market system is to ensure that the RFQ is seen by the sell-side trader, since it will be displayed on a GUI which is generally found on every sell-side trader's desktop.

In a further alternate embodiment, a market participant enters either (1) a query request that is used by the system to compute a dissemination list, or (2) order parameters from which a dissemination list is calculated by the system based on ranking likely contras by probability of execution. But in this embodiment, in contrast to those described above, the resulting dissemination list is sent to a non-system entity responsible for sending messages to the members of the list (as opposed to having the messages sent by the system of the present invention). The non-system entity is preferably contractually bound to respect the confidentiality of the dissemination list, and to use the contents of the list only for the purpose of sending information to members of the list. As above, the sent information may include orders, or information about orders.

In a further alternate embodiment, the dissemination list is sent to the same party who entered the query request (or the data from which the dissemination list was calculated). In a still further alternate embodiment, the contractual agreement (to use the dissemination list for no other purpose than to send its members information) is supplemented by a system certification process wherein a jointly-chosen consulting firm analyzes the software system used by the party receiving the dissemination lists, to certify that the software system maintains the confidentiality of the lists received and uses the lists only for the purpose of sending securities-related information to members of the lists.

In a further alternate embodiment, the contract further imposes an auditing procedure, wherein a mutually-agreed-upon auditing firm certifies that the party receiving the dissemination lists has maintained the confidentiality of information therein and used it only for the intended purpose.

A further embodiment comprises a depository of orders that can be pulled by any matching system. Orders placed here are dormant but any third party with execution authority can draw from this liquidity pool. This is particularly valuable in a world that features an increasing number of auction systems: Optimark, POSIT, AZX, eVWAP, and others that service a growing number of call auctions. In call auction trading, customer orders for a stock are batched together and executed in multilateral trades at specific points in time when the market for the stock is "called." This contrasts with continuous market trading where a transaction is made any time a buy and a sell order meet in price during the trading day. Recent advances in computer technology have considerably expanded call auction functionality.

Different auctions execute at different times, which are often not publicly known (for example, POSIT has a 5-minute fuzzed match), making it very difficult indeed for a trader to know where to place an order. This fragmentation problem is far worse than the corresponding problem in continuous markets, since there is fragmentation in time as well as in space.

Figure 8:
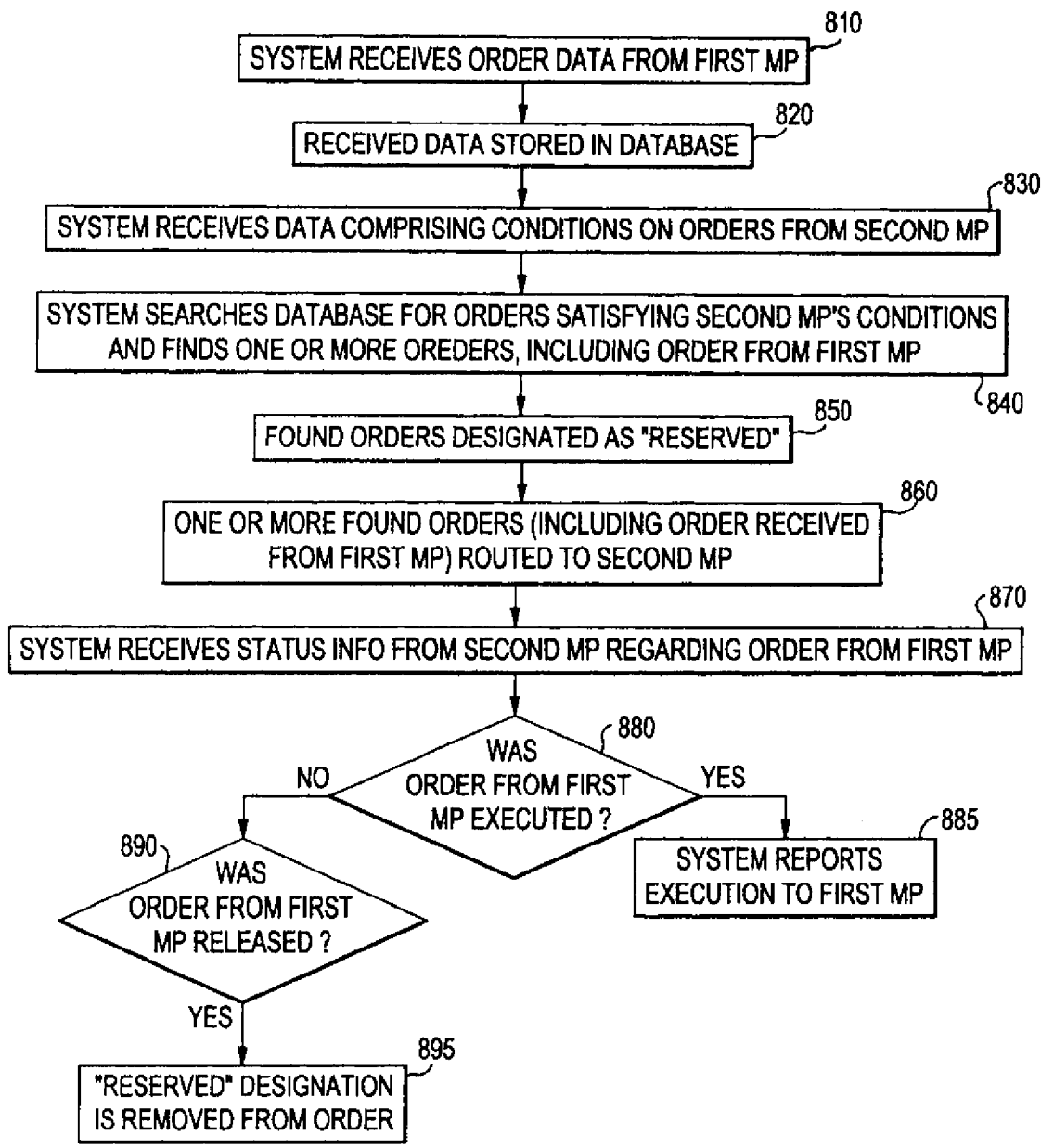
FIG. 8 is a flowchart showing steps of an order depository embodiment.

The order depository embodiment allows participating auction systems to pull eligible orders from this liquidity pool, thereby eliminating the fragmentation problem for multiple call auctions. A preferred method is depicted in FIG. 8. At step 810, a preferred system receives data comprising an order from a first MP, and at step 820 the received data is stored in a database. At step 830 the system receives data comprising conditions on orders from a second MP (e.g., a participating third party auction system). At step 840 the system searches the database for orders that satisfy the conditions received from the second MP, and finds a collection of one or more orders ("found orders") comprising the order received from the first MP. When such orders are found, they are designated, at step 850, as "reserved." At step 860 one or more of the found orders (the orders found in the database that satisfy conditions received from the second MP) (including the order received from the first MP) are routed to the second MP.

At step 870 the system receives data from the second MP regarding the status of the order from the first MP that was routed to the second MP. If at step 880 the received status data indicates that the order was executed, then at step 885 the system reports the execution to the first MP. If at step 880 the data does not indicate that the order was executed, then the system checks at step 890 whether the data indicates that the order was released. If so, then at step 895 the released order is un-reserved (the "reserved" designation is removed).

An alternate embodiment does not rely on third party auction systems to pull orders from the depository, but instead actively routes the orders out to such systems for a possible match. When the choice of destination is based on CTI information, this is an example of the order routing embodiment described above. Another situation arises when call auctions do not publicly release the precise timing of a call, in order to reduce the potential for gaming opportunities. For example ITG's POSIT runs midpoint matches with a fuzzed call time; the uncertain time of the call reduces the temptation to game the system by placing, for example, a large sell order and then buying up the market immediately prior to a match, in order to move the midpoint price up and get a better price on the sell order in the event of a fill. With an uncertain match time the MP would have to sustain buying during several minutes and risk having potential matching orders in POSIT get canceled. The uncertainty about the matching time creates a problem for traders: they must either face the multiple exposure problem when the same order is placed in various systems to increase the probability of a match, or commit the order to a single system and risk missing an opportunity to trade in another system. In this alternate embodiment, call auctions that do not publicly display the time of a match submit this information confidentially to the system, which then uses that information to reserve the orders from the order repository and route them to the call auction just prior to a match. Because it knows the precise time of a call, the system does not have to commit the order to the call auction for more time than is necessary to check for a possible matching contra order. From the perspective of the auctioneer, the only effect of providing the confidential information on the timing of a call is to attract more executable orders.

Database queries: In a preferred embodiment, a CTI notification router targets notifications of trading interests to likely contras by performing queries in CTI information databases. The description below describes preferred databases and preferred queries that effectively rank likely contras.

Trade Database: Who traded . . . against whom? Trades often originate from buy-side traders and are routed by a broker to a marketplace or ECN where they either execute or get routed to another execution destination where a better price may be available. In this process of executing a single trade, several intermediate reports are generated, neither of which carries complete information on both the end-buyer and the end-seller's identity.

Automated Confirmation Transaction Services$^{SM}$ (ACT$^{SM}$) data contains mandatory trade reports for the tape, and clearing reports; the only available information on the identity of the buyer and seller is the Market Participant ID (MPID), a 4-letter symbol assigned to each member of the stock market.

An example helps to illustrate how ACT data can be used to reconstruct a trade: a private individual places an order to sell 500 shares of DELL through an order entry firm such as a discount broker, or through an ECN such as Archipelago (ARCA). This order will be routed to the market center with the best bid at the time. Thus, ARCA may route the order to Instinet (INCA) for example. The contra order itself may belong to a buy-side firm such as Fidelity, and is presented on the market by a clearing broker, say Bear Stearns (BEST). Instinet would report a trade where INCA buys from ARCA, and another trade for the same amount where INCA sells to BEST: these reports are issued for clearing purposes. ARCA would internally effect a book entry for their customer and issue a mandatory report to ACT as the selling broker. Internally, BEST takes note of the transaction being executed for their customer Fidelity, and will clear and settle the trade in Fidelity's name.

The ACT data in itself is incomplete in several ways: the identity of the end buyer and seller are not given in the ACT report, and one is not required to issue clearing reports immediately after the trade. Clearing information submitted through ACT, however, does allow one to identify which are the two sell-side participants (brokers) that mediated each trade as agent, or executed the trade for their own account.

Other sources of information besides ACT data can be used, such as trade reports by broker-dealers, from the buy-side clients themselves, or from communication providers such as NYFIX that route orders. Information on the identity of the end buyer/seller is available from any of the following sources: (1) the broker or clearing firm which booked the trade for its client; (2) the clients themselves; and (3) via the networks and software systems that "know" the end user's location and message routing instructions. Examples include order management systems and trading systems such as ECNs, as well as auction server 60.

In general, the trade database will contain incomplete records of trades and orders, and must be capable of receiving further information as it becomes available to complete the records. A preferred embodiment is built to function with an incomplete trade database.

A preferred system receives trade report data from the market (such as ACT data) and, optionally, voluntary trade reports from brokers and clearing firms. When only the market data is received, the brokers will be listed as parties to the trade. When the end user information is received (for example, from an auction server 60), this information is added to the description of the trade.

Dealing with incomplete end-party identification: When the result of a CTI query is that a notification should be sent to an "MPID" (i.e., it is not possible to further refine the identity of the target), a preferred embodiment uses an organization-specific function to map this MPID to a list of users. The system supports different possibilities. For example, a user representing a client firm could choose from the following options:

1. Send to all users within the organization associated to this MPID (for example, if the MPID is "MLCO," then all Merrill Lynch traders can view the notification).
2. Do not notify.
3. Send to a unique "wild card" user for re-distribution. For example, this may be an Instinet router that can forward the message to the appropriate terminal.
4. Send to a list of users or accounts specified by the organization (for example, MLCO may request that such notifications be sent to their block desk but not to their proprietary trading desk).

When the result of a query is an account (i.e., an aggregate of users that share information and aggregate their trades on behalf of the same account), the system will associate a list of users to this account. In an alternate embodiment, there is a messaging destination such as a FIX message destination associated to each account. When messages are sent to users, the procedure is based on an account-specific function. By default, all users at that account are targeted and no other users receive the notification, but other possibilities are supported as well. For example, it is possible to set up another account so that it always receives these notifications as well. An organization may specify that all users within the organization should receive this notification. Or the notification may be sent to a single user, or to no one at all.

Finally, queries may return individual users. In that case an account-specific function is used to determine who should be notified: this can be the user only, all users that trade for the same account, all users within the organization, or no user at all. The list is not intended to be exhaustive.

Trade data by type of contra: trades are preferably classified as being against a member firm (when the contra party was a Nasdaq member firm), against a non-member (contra party was not a member firm), or a "cross" (when the broker reports a trade as a cross, or reports the trade against a non-member as Agency). A seller would want to notify someone that is likely to buy—that could be a buyer against other member firms, in which case the assumption is that this buyer is working an order and will continue to do so, or a member firm selling to a non-member, which indicates that the broker is taking over the position and will then turn to work it as Principal. Brokers that implemented a cross can be of interest to a buyer or to a seller, since this trader would be in contact with both buying and selling customers.

Queries by level of trader ID information: In database queries, the system will support queries that only look at trade data entries where the end user is known; or queries that consider only trade data where the end user is not known; or all data entries.

Accounts: Accounts represent information sharing pools: if one user is allowed to receive a notification then all users within that account would be allowed to receive the same notification. Trade data likewise is attributed to accounts, so that database queries that look for the 10 biggest buyers, for example, would aggregate the trades per account and seek the accounts with the greatest net number of shares bought. When the end user is not known, the system assigns a default "star" account representing the sell-side organization brokering the trade. Queries can be executed on accounts, in which case the result of a query is always a list of accounts.

Sources of trade information: Information on trades preferably comes from at least the following sources:
1. ACT trade reports that get forwarded to the NSCC.
2. Auction Server trade reports: Includes the system user ID (specific to a particular terminal) on both sides of the trade, on top of the two relevant MPIDs.
3. Broker-dealer trade reports: Participating Broker-dealers are able to associate the end user ID to their side of a trade as a service to their buy-side customers, who can then register to receive CTI Notifications.

Aggregating buy-side trading data. In an alternate embodiment, Broker-dealers are allowed to use a code name in lieu of the true client name when they provide data on trades they executed on behalf of their buy-side clients. This trading data would then let their customers attract notifications specifically from the trades they executed with that specific broker, not counting any trades executed through other brokers and that would be contributed to the trade database under different coded names. In this model there is an incentive for the buy-side client to focus their trading activity with a single broker and thereby place a stronger bid for the right to receive notifications. In an extension of this embodiment of the subject invention, the system offers brokers a service whereby each participating broker can agree to disclose the mapping between the coded client name and the corresponding actual client ID. In return, the participating brokers receive the notifications sent to the buy-side client firm identified by a query on buy-side aggregate trading. The following example helps to understand how this works. Mutual Fund A is working an order to buy through 8 different brokers to minimize market impact, sending 10,000 shares through each broker; Mutual Fund B wants to sell a large block of stock and submits dissemination parameters to notify the biggest buyer's brokers. Three of the eight brokers have disclosed the true client ID, so the query will return Mutual Fund A with 30,000 shares done and five different coded IDs with 10,000 each, in the absence of other relevant data. Mutual Fund A is thus identified as the largest buyer, and the three participating brokers (those who have disclosed Mutual Fund A as the client) receive the notification of the large block on the contra side and can call their client for more.

In an alternate embodiment, the situation wherein multiple brokers provide information on the same client is resolved using a "winner-take-all" approach, where the notification is sent only to the broker that provided the largest amount of information (such as the largest net sum of shares traded by their client) as opposed to sending it to all brokers having provided information that was part of the aggregation. In a further alternate embodiment, the broker enabling aggregation by releasing the true identity of the client will specify whether he is willing to share the receipt of notification with other brokers. Once the aggregation is performed and the target client is identified, a broker who is not willing to share notification with others will be the only recipient of a notification if in fact this broker is the largest contributor of data, and is larger than the aggregate group of sharing brokers. If this is not the case, he will not be notified and the sharing parties or single largest non-sharing broker will be notified instead. This embodiment enables participation by large and small brokers within the same system without creating a system-enforced bias that would either give smaller players equal access to the large broker's clients or, on the other hand, lock in the large broker's existing dominant position and not permit entry by smaller players willing to pool their data.

In an alternate embodiment of the notification mechanism, the brokers providing data also enable blind pass-through of the notification message itself. In this embodiment, the system uses encryption techniques that are known in the art to ensure to the originator of CTI notifications that only the intended recipient (buy-side client of the broker, not the brokerage itself) will be able to see the content of said CTI notification message. In the blind pass-through embodiment, the contractual terms ensure that the broker is rewarded for participation through sharing the commission on the trade. In the case where multiple brokers have provided data relevant to targeting the same client, the broker's share of the commission revenue for the trade is an equal proportion of the total commission on the order, or a lesser amount if the corresponding proportion of the executed size were less than the amount of data provided in earning the right to notify the client. For example, the order was executed for 15,000 shares and three brokers had contributed data that helped identify the counterparty as follows: broker A had previously bought 3000 shares on behalf of the recipient, broker B had bought 22,000 shares and C had previously bought 15,000 shares all on behalf of this same recipient. Broker A would get the commission corresponding to 3,000 shares, while brokers B and C would get a third of the total or the commission equivalent to 5,000 shares each. If the execution was instead for 1 million shares, then the three brokers would get the commission corresponding to 3,000, 22,000 and 15,000 shares, respectively. If the amount of data contributed is negligible as compared to the size of a trade, then it is reasonable to affirm that the data was not the chief factor in enabling the trade. Other billing methods that adequately reward the data providers and encourage their participation will be apparent to those skilled in the art.

In an alternate embodiment of the multiple broker notification, the originating user specifies in the dissemination parameters the conditions that brokers must satisfy in order to receive a notification message, in the event that multiple brokers were contributing aggregated data. For example, the user will provide a list of brokers that are eligible for notification (the originator will know with which brokers they have been working the order, but may wish to notify only one or a subset of them). In an alternate embodiment the user enters a condition on the amount of trading data provided—for example, by specifying that (when data from multiple brokers was aggregated) only brokers having contributed a net size of at least 10,000 shares should be notified.

The following table describes structure of a preferred trade database:

| Field name | Comments | Required/optional | Type |
|---|---|---|---|
| MPID | Required. This is the executing party, not the service bureau. | Required | Char[4] |
| Username | System username is available on all system trades. This party is the seller, the contra will be the buyer. | Optional | Char string |
| Account | Available for Transaction Server trades | Optional | Char string |
| Client name | Buy-side client firm, or "blank" if it is not a buy-side account. | Optional | Char string |
| Blind pass-through | "Y" or "N". Needed to support queries on buy-side accounts only | Optional | Char |
| Dissemination list ID | For transactions that follow notification requests, this will be the dissemination list ID. Otherwise it will be blank. | Optional | Char string |
| Query Eligible | Boolean. Specifies if this trade can be counted in queries. Default is "Y", but there are special cases where a user would want a trade not to attract notifications. This information will come via Transaction Server. | Required | Boolean |
| Contra Type | Member (M), Non-member ("N") or Crossed ("X") | Required | Char |
| Contra MPID | Required. This is the true contra party, not the service bureau. | Required | Char[4] |
| Symbol | | Required | Char[4,5] |
| Quantity | (shares) | Required | INT |
| Price | Nominal, USD | Required | Float |
| Trade reference number | Issued by ACT | Required | Char string |
| Branch Sequence number | Issued by the reporting party | Optional | Char string |
| Execution time | | Required | INT |
| Reporting time | | Required | INT |
| Reporting Capacity | Principal, Agent | Required | Char |
| Media | Can be "N" (not reportable) or "R" (report to media/tape). | Required | Char |
| ACT Status | Refers to the status of the trade in ACT.<br>A = Accepted<br>B = Broken (Previously locked-in trade)<br>C = Canceled<br>D = Declined<br>E = Error<br>F = Forced match; locked-in trade<br>G = One-sided submission (give-up lock-in: reports trade against ACT inactive participant)<br>I = Inhibited (by clearing firm)<br>K = Rejected sizeable trade<br>L = Automatic locked-in trade at end of T + 1<br>M = Matched; locked-in by ACT<br>N = No/Was trade (trade did not occur)<br>R = Locked-in trade; rec'd via execution system interface and locked-in by Qualified Special Representative (QSR) or by Nasdaq<br>S = Automatic locked-in split trade at the end of T + 1<br>T = Trade reporting only and not for clearing submission<br>Note: these are the end-results of the ACT processing. A preferred embodiment subscribes to real-time updates, so temporary ACT status entries should be recognized as well. | Required | Char |

| Field name | Comments | Required/optional | Type |
|---|---|---|---|
| Source | "M" and "N" are ACT reports by member firms. "O" is SelectNet, "S" is SOES, "A" is ACES, "C" is CAES, "I" is ITS, "F" is Optimark, "U" is UTP. | Required | Char |
| QSR | Clearing flag: "Q" will not clear through ACT, "Z" will clear through ACT, "N" ticker only, "L" is locked in will clear through ACT, " " (space) will match and clear through ACT. | Required | Char |
| As-of | Boolean, "Yes" when the trade was executed after hours the previous day and is therefore being reported late and should not be printed on the tape. | Required | Boolean |
| PRINC_MKT_PART | "Y", except for ECNs and Chicago/other marketplaces where it takes value "N". | Required | Char string |

Trade Database Queries

In a preferred embodiment, the system offers users simple forms to assist users in the task of creating useful queries. In the following examples, the user is trying to sell a block; the forms are designed to identify potential buyers. The reader skilled in the art will easily discern how these forms should be modified when the user is trying to buy a block rather than to sell.

Counting notification targets: One of the key concerns in institutional trading is controlling the number of parties that are notified of the institution's trading interest. Another is to try to notify natural contras, rather than traders that would be more likely to trade on the information or share it with others.

To control the number of parties targeted, a preferred embodiment supports queries that rank likely contras and send notifications only to the top N targets. Such queries give the user complete control over the number of parties targeted as well as the conditions that they must satisfy in order to be included in the dissemination list.

To count targets, a preferred system keeps track of which users currently have an open push channel (such as a TCP connection) or are otherwise reachable via communication channels that support alert delivery (such as a pager). Users can also choose to receive alerts via email. In this last case the system preferably verifies that the user is paying attention to the channel by requesting a receipt and monitoring that the user sends the receipt back within a few seconds. Only users that have an open session or a valid alert channel can be members of a ranked dissemination list. Queries exclude all data entries attributed to users, accounts, or MPIDs that are not reachable; an account or MPID is "not reachable" if it contains no reachable user.

Described next are some of the trade database queries that are offered to users at the graphic user interface level; these should be viewed as examples and not as an exhaustive list.

1) Basic Notification: 10 biggest contras (buyers against member firms): This basic notification window offers a simple CTI query to identify potential block buyers. This query uses ACT data to identify the N (10 by default) MPIDs that have purchased the largest number of shares net (bought minus sold) from other member firms through trades of at least X shares (1100 by default), in the course of the last Y minutes (30 minutes by default). This indicates that they are working a customer order or building up a position and are likely to continue to accumulate stock in the near future. Settable parameters include: (1) Maximum number of parties targeted: rank the biggest buyers and notify the top 10 if there are at least 10 that fit the user's criteria; Time: count trades during the past N minutes (default is 30 minutes)—different default values for different symbols are supported; and (3) Size: count only trades larger or equal to this size (default is 1100 shares)—different default values for different symbols are supported. Alternate query: count total buys (gross amount bought) without subtracting out sells.

A user can further refine the above basic query by specifying that the contra-party must be within a list of MPIDs. For example, a user may target buyers that trade on ECNs, by listing all their MPIDs—or specifically target Instinet traders only, using a query for buyers against INCA.

In another refinement of the same query, the user can request that the query should consider (or not) any buyer based on price aggression, comparing the price to the national market best bid and best offer at the time of the trade. Price aggression can be categorized as passive (for buys at the bid or below), neutral, or aggressive (buys at the ask or higher).

2) Block desk query: 3 biggest sellers to non-members: this notification window offers a query that identifies block desks that have taken a large position over from a buy-side client. This type of trade is reported to ACT as an MPID trading as Principal against "blank": no contra party MPID is mentioned in the ACT report, and the broker is trading for his own account (not as Agency for another client). Broker-dealers that take over large blocks from institutional customers will often turn to the markets to recover at least part of the position. For example, a block desk that sells a block to an institutional client will want to buy on the market and on ECNs to rebuild the position. So a seller would like to target block desks that have recently sold a large block to a non-member firm and would be looking to buy. From the point of view of the block desk trader, he reports the trade to ACT and immediately begins to see notifications from users with a contra-side interest; this makes his work easy.

The query uses ACT data or broker-dealer voluntary trade reports (which can be verified a posteriori using ACT data) to identify the N (10 by default) MPIDs that have sold the largest total number of shares through trades of at least X shares (10,000 shares by default) against non-members during the last Y minutes (60 minutes by default). Settable parameters include: (1) Maximum number of parties targeted: rank the biggest sellers and notify the top 3 if there are at least 3 that fit the user's criteria; (2) Time: count trades during the past N minutes (default is 60 minutes); and (3) Size: count only trades larger or equal to this size (default is 10M).

3) Graphic trade selector: allows users to view trade and bid-ask data in a histogram-style representation of the tape, where each trade is represented as a vertical bar whose height is proportional to the size of the trade (number of shares on the vertical axis) and is colored blue (for example) when the trade is at the ask or above, red (for example) when it is at the bid or below, and black (for example) when the trade was inside the bid-ask spread. The color-coding lets the user easily identify and select aggressive buyers (the buyer behind a tall blue line) or aggressive sellers (tall red lines), and query the CTI database to send a notification specifically to the corresponding traders.

To use this feature, the user scrolls with a mouse over the graph. When the mouse cursor passes over a circular activation region centered at the tip of a bar (trade) the histogram bar becomes thicker, indicating that the trade can be selected by clicking. When the user clicks on a bar, a short description of the selected trade appears in a text box next to the graph. For example:

"12:31 buyer 5300@45⅛=ask"
"12:35 buyer 2700@44⅞=midpoint"

The system receives the time, size, and symbol and queries the database to find the identity of the buyer and seller behind the trade.

The query will look for both buyers and sellers, but keep the buyer if it is a member firm reporting against another member firm, the seller if it is a member firm reporting a trade with a non-member, and whichever party reported the trade if it was a cross. Alternatively, the user can choose to not notify anyone if it was a cross, or to issue the notification only if the trade was in either one of the three categories.

4) Large block buyer from member firm: sends the notification to any user that has purchased a block of at least X shares in the course of the past N minutes. Fields to be entered by the user are: (1) Time: count trades during the past N minutes (default is 60 minutes); (2) Size: order size should be at least this large (default value is 10,000 shares); and (3) Minimum price aggression: a drop menu allows the user to select among three options: consider all buys, buys above the bid, or aggressive buys only (ask or better) (default is above the bid). A similar query identifies large block sellers to non-members.

5) Repeat Buyers against member firms: targets users that have bought X shares at least Y times during the past N minutes. Fields to be entered by the user are: (1) Time: count trades during the past N minutes (default is 60 minutes); (2) Size: trade size should be at least this large (default is 3,000 shares); (3) Number of trades: the trader should have executed at least this many buys (default value for this field is 2); and (4) Minimum price aggression: a drop menu allows the user to select among three options: count all buys, buys above the bid, or aggressive buys only (ask or better) (default is above the bid).

By listing MPIDs that must be on the contra side, the user can further refine this query, for example, to count only trades where the contra party was one of the three largest ECNs. A similar query identifies repeat sellers to non-members.

6) Buyers against MPID list: targets MPIDs that have bought a total of at least X shares from a list of contra-party MPIDs, during the past N minutes. This could be a specific contra-party MPID, or a user-defined list, or a system group such as ECNs. Fields to be entered by the user are: (1) Time: count trades during the past N minutes (default is 60 minutes); (2) Size: trade size should be at least this large (default is 3,000 shares); (3) Minimum price aggression: a drop menu allows the user to select among three options: count all buys, buys above the bid, or aggressive buys only (ask or better) (default is above the bid); and (4) List of MPIDs: this may be a single MPID, a system group, or a list entered by the user.

7) Auto-ex imbalance: this query will target MPIDs that are Market Makers and have been selling at the ask more than they've been buying at the bid, counting only executions when the MM was not at the inside, but counting out MPIDs that have sold a block during the same time period. Fields to be entered by the user are: (1) Time: count trades during the past N minutes (default is 20 minutes); (2) Net size sold: net traded size (sells minus buys) should be at least as large as Size (default value for this field is 20,000 shares).

Queries on Orders

Data on open orders are provided by a trade execution facility (such as Nasdaq SuperMontage or SelectNet), by a broker-dealer or ECN, or by traders. Traders can provide data manually or via their order management systems; in those cases the system monitors the accuracy of the data a posteriori when respondents try to execute the order, and filter out trade entry reports from traders that have reported inaccurately in the recent past.

1) 10 most aggressive orders to buy: this query will allow a seller to notify the 10 users with the most aggressive open buy orders at least as large as a seller-specified SIZE. Orders will be ranked by aggression using an algorithm that takes into account price, size and minimum quantity. The default algorithm is as follows: first filter out orders that are smaller than SIZE, then rank all orders by price, size (largest size gets top ranking) and minimum quantity (smallest minimum quantity is ranked higher than a large minimum quantity). Ties are broken by time of entry, or by random ordering using random number generators that are well known in the art. Alternate algorithms may later be offered, such as ranking by time of execution. Fields entered by the user are: (1) Size: order size should be at least this large (default is 5,000 shares); and (2) Min Quantity: if this box is checked, the query will count only orders with minimum quantity less than or equal to this quantity (default setting is 10,000 shares).

2) Unfilled trading interest: this query identifies users of the preferred system that have initiated a CTI notification to buy that expired without having been canceled by the initiator, and where the accompanying order was not completely filled, and that have responded to a CTI notification with an order to buy.

Parameters for this query are: (1) Maximum number of parties targeted: rank the biggest buyers and notify the top 10 if there are at least 10 that fit the user's criteria; (2) Time: count the orders that expired during the past N minutes (default is 60 minutes); (3) Size: count only orders larger or equal to this size (default is 10,000 shares); and (4) Min Quantity: count only orders with a min quantity less than this size (default is 10,000 shares).

*69 functionality: Users of a preferred embodiment can deliver notifications to users that have traded with them on an Auction Server, or users who sent them CTI notifications. A graphic user interface 900 (see FIG. 9) preferably provides a list of trades and notifications with checkboxes 910 that the user can "click" to select notification targets. Sorting by time, size, and symbol is available. The system makes a default selection by choosing all contra parties for the day's trading activity. The left part 920 of the screen represents CTI Notifications received in the past; the right part 930 of the screen contains a list of executions. The user clicks on check-boxes 910 to select the targets to which a new notification should be sent.

In a further alternate embodiment of the subject invention, the system is an enhancement of an electronic trading system such as an ECN. In this embodiment, he system enables a user to request that a notification of the user's order be directed to any party who enters an order on the contra side when that second order is within a given price or size difference from the first order. Preferably, both orders are either completely confidential or contain a large reserve quantity that was not displayed to the market, so that the two parties would otherwise never have discovered that they were very close to matching a large hidden size. In this embodiment, if both parties have requested that their order be advertised to near-matching contras, as described above, then an order notification is delivered to the second party entering the order, but not to the first, so that the system functions in the same way as if the second participant had not requested that his order be advertised to near matching contras. In an alternate embodiment, both parties would, in that case, be notified of the existence of the near-match with another party's order, and both may come back with a better counteroffer to close the gap and thus enable the trade to take place.

In a distributed implementation of this same embodiment a plurality of ECNs agree to cooperate on pooling their clients' trading interest in the following manner: when one of the parties receives an order from a customer and is unable to match that order internally, it will electronically transmit the order to each of the other parties sequentially, using an ordering algorithm that maximizes the likelihood of an early execution match, as is known in the art, but in each order routing event, if a matching contra is not found, but instead there is a second participant confidential order that nearly matches the first participant's order, then the ECN receiving the routed order will notify the second participant of the existence of the near-match. The second participant can then respond with a better price or size to close the trade. Preferably, the first order that was not immediately matched is returned to the first ECN and the second participant's subsequent response order is routed to this first ECN for matching. In an alternate embodiment, the first participant's order stays in the second participating ECN for the specified "time in force" during which the second participant is able to respond. If the second participant does not respond within this time in force, the first order is returned to the first ECN with unfilled order status. Preferably, in this "multiple-ECN model" the parties share commission revenues as they would in the case where the order were simply routed from the first ECN to the second for execution, so that the notification mechanism does not entail any change in billing but instead simply increases the frequency of matches. In an alternate embodiment, the party responding to a notification (second participant) agrees to pay a fee for removing liquidity when entering a response order, thereby creating additional revenue for the second participating ECN.

In these embodiments a computer system is installed at participating ECNs that receives data on the system's orders, stores said data, and enables queries against the order data to determine whether a participant's size and price difference conditions are met. The system of this alternate embodiment also contains interfaces with each participating ECN's existing system that enable it to deliver order notification messages to the ECN's customers. For example, for ECNs that use a FIX interface to their customers, the order notifications are packaged as FIX IOI messages for routing by the ECN's FIX engine. In an alternate embodiment the system maintains direct communications with the client such as through a Web server, using methods known in the art as "push technology."

Those of ordinary skill in the art will recognize that the computer-implemented system and method described herein provides at least the following advantages:

(1) The system can calculate the total buying of potential contras by summing the shares purchased or sold in a plurality of executions, but an initiating user cannot determine whether such multiple executions originated from the same market participant.

(2) The system can receive dissemination parameters from an initiating party (such parameters as the minimum total number of shares that a party should have bought or sold to receive the notification) and create a list based on these parameters containing zero, one, or several dissemination targets—but the number of targets that satisfy the initiator's dissemination parameters is not known to the initiator.

(3) Instead of an IOI, a message can be routed that comprises a certified trading interest. An example (described above in relation to a preferred embodiment) is a notification sent regarding an open order that can be automatically executed by responding to the notification, or (in an alternate preferred embodiment) a message that contains an executable order.

(4) The system preferably receives data from multiple broker-dealers, allowing the system to compare multiple records of the same trade to "net out" middlemen and identify the end buyer and seller. For example, if MP1 buys 1000 shares of DELL from MP2 on an ECN, the brokers on each end of this trade will know only that they traded with this ECN. But when each broker reports his information to the system, the system can compare the two reports and identify the two end parties to the trade, enabling MP1 to subsequently negotiate a trade directly with MP2.

(5) The system can receive information on the buy-side origin of a trade from a plurality of broker-dealers. Thus, the system can reconstruct the complete trading activity of a buy-side party when that buy-side party is working an order through a plurality of broker-dealers and/or ECNs.

All these are ways of using confidential information in win-win situations, where the providers of information benefit by earning the right to attract more information or more order flow, for their own account or for that of their clients. When the advantaged party is the data provider's client(s), it is clear that a successful business application will include a sharing of the benefits with the data provider to encourage participation.

FIGS. 10-20 show steps of method embodiments described herein.

Figure 10:
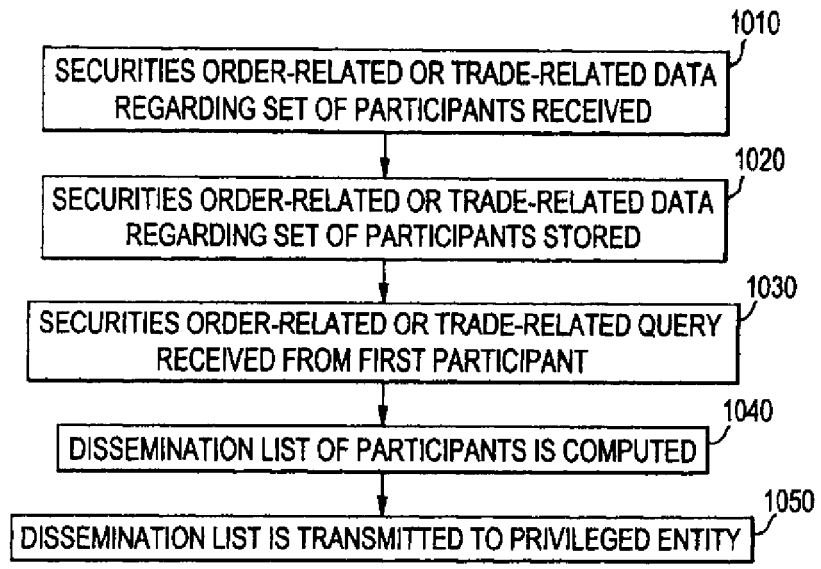
FIGS. 10-20 are flowcharts showing steps of further embodiments.

FIG. 10 illustrates steps of a method of managing securities market information. At step 110 securities order-related or trade-related data regarding a set of securities market participants is electronically received. At step 1020 said received order-related or trade-related data regarding said set of securities market participants is electronically stored. At step 1030 a securities order-related or trade-related query from a first securities market participant is electronically received. At step 1040, based on said order-related or trade-related query received from said first securities market participant and on said securities order-related or trade-related data regarding said set of securities market participants, a dissemination list of securities market participants is computed. At step 1050, said dissemination list is transmitted to an entity who has been granted a privilege of receiving such lists in exchange for being contractually bound to respect confidentiality of the dissemination list and to use the list only for the purpose of sending securities-related information to members of the list.

Figure 11:
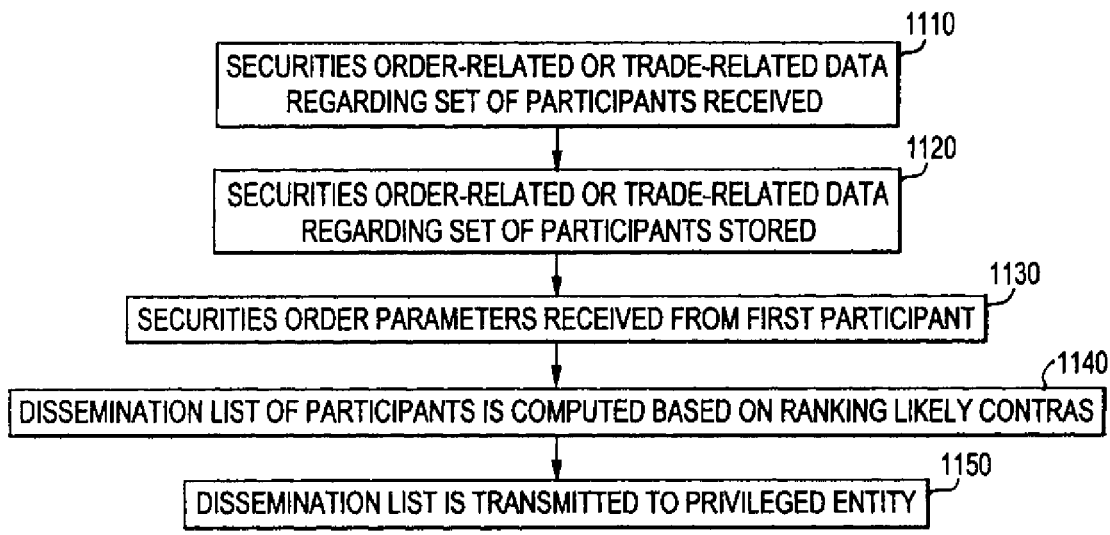

FIG. 11 depicts steps of another method of managing securities market information. At step 1110, securities order- or trade-related data regarding a set of securities market participants is electronically received. At step 1120, said received order-related data regarding said set of securities market participants is electronically stored. At step 1130, securities order parameters from a first securities market participant is electronically received. At step 1140, based on said securities order parameters received from said first securities market participant and on said securities order- or trade-related data regarding said set of securities market participants, a dissemination list of securities market participants is computed based on ranking likely contras by probability of execution. At step 1150, said dissemination list is transmitted to an entity who has been granted a privilege of receiving such lists in exchange for being contractually bound to respect confidentiality of the dissemination list and to use the list only for the purpose of sending securities-related information to members of the list.

Figure 12:
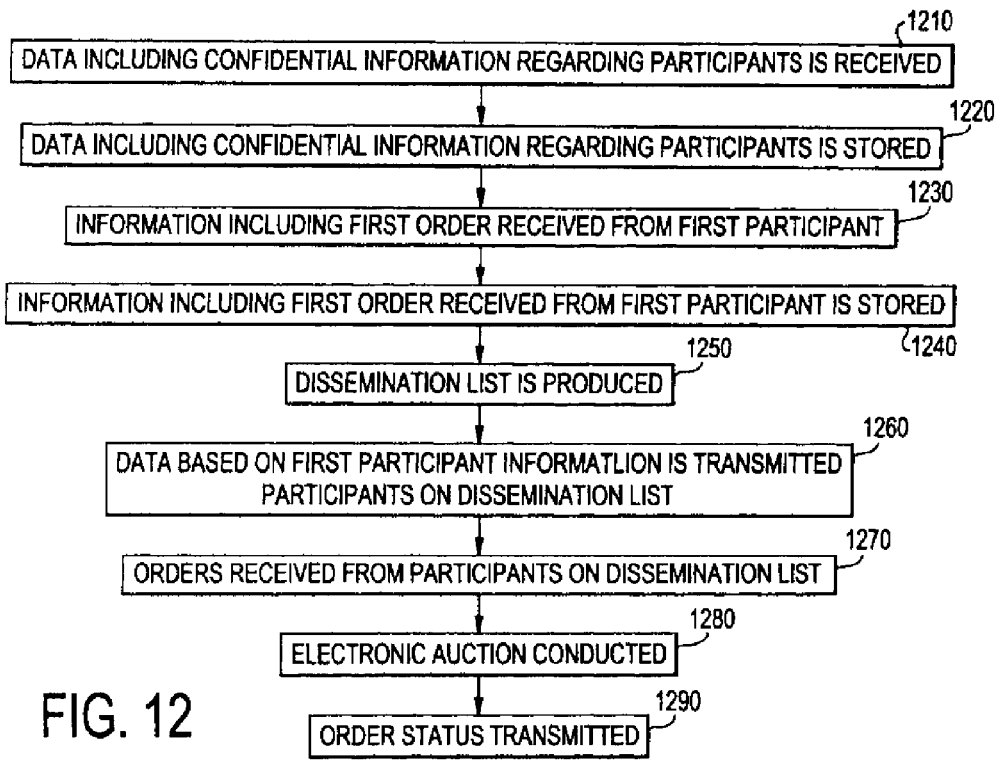

FIG. 12 depicts steps of a method of effecting a targeted auction. At step 1210, data including confidential information regarding market participants is electronically received. At step 1220, said received data regarding market participants is electronically stored. At step 1230, information including a first order from a first market participant computer is electronically received. At step 1240, said information received from said first market participant computer is electronically stored. At step 1250, a targeted dissemination list of market participants is produced based on said stored data regarding market participants and said information received from said first market participant computer. At step 1260, data based on said information received from said first market participant computer is electronically transmitted to the market participants on said targeted dissemination list. At step 1270, subsequent orders from market participants are electronically received in response to said transmitted data. At step 1280, an electronic auction is conducted among orders including said orders received in response to said transmitted data; wherein in said auction an order is displayed as a passive order and executes immediately against contra orders at that price, but upgrades its price to a more aggressive price for randomly-scheduled match check events where neither party has control of time of execution. At step 1290, the statuses of orders are electronically transmitted to the respective market participants who initiated them.

Figure 13:
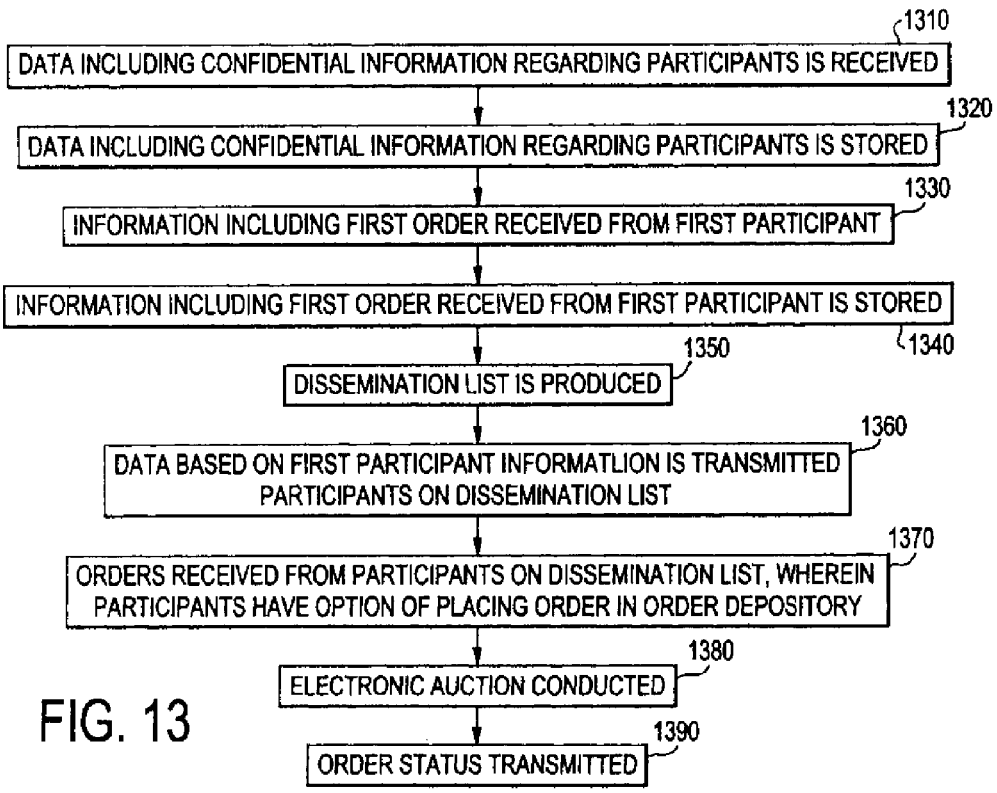

FIG. 13 depicts steps of another method of effecting a targeted auction. At step 1310, data including confidential information regarding market participants is electronically received. At step 1320, said received data regarding market participants is electronically stored. At step 1330, information including a first order from a first market participant computer is electronically received. At step 1340, said information received from said first market participant computer is electronically stored. At step 1350, a targeted dissemination list of market participants is produced based on said stored data regarding market participants and said information received from said first market participant computer. At step 1360, data based on said information received from said first market participant computer is electronically transmitted to the market participants on said targeted dissemination list. At step 1370, subsequent orders from market participants are electronically received in response to said transmitted data, wherein market participants have the option of placing an order in an order depository without initiating an auction or invoking targeted dissemination of data, said orders being dormant until an auction is initiated in that stock. At step 1380, an electronic auction is conducted among orders including said orders received in response to said transmitted data. At step 1390, the statuses of orders are electronically transmitted to the respective market participants who initiated them.

Figure 14:
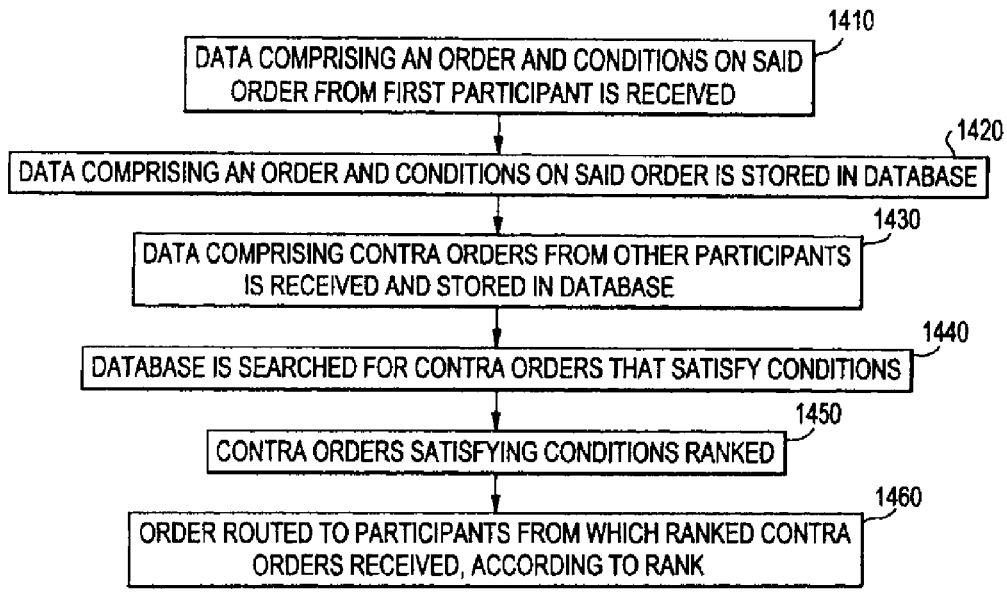

FIG. 14 depicts steps of a method of managing orders in a securities market. At step 1410, data comprising an order and conditions on said order from a first market participant is electronically received. At step 1420, said received data is electronically stored in a database. At step 1430, data comprising contra orders from other market participants is electronically received and stored in said database. At step 1440, said database is searched for contra orders that satisfy said conditions on said order from said first market participant. At step 1450, contra orders that satisfy said conditions are ranked according to criteria comprising said conditions. At step 1460, said order received from said first market participant or portions thereof are routed to market participants from which said ranked contra orders were received, according to ranking.

Figure 15:
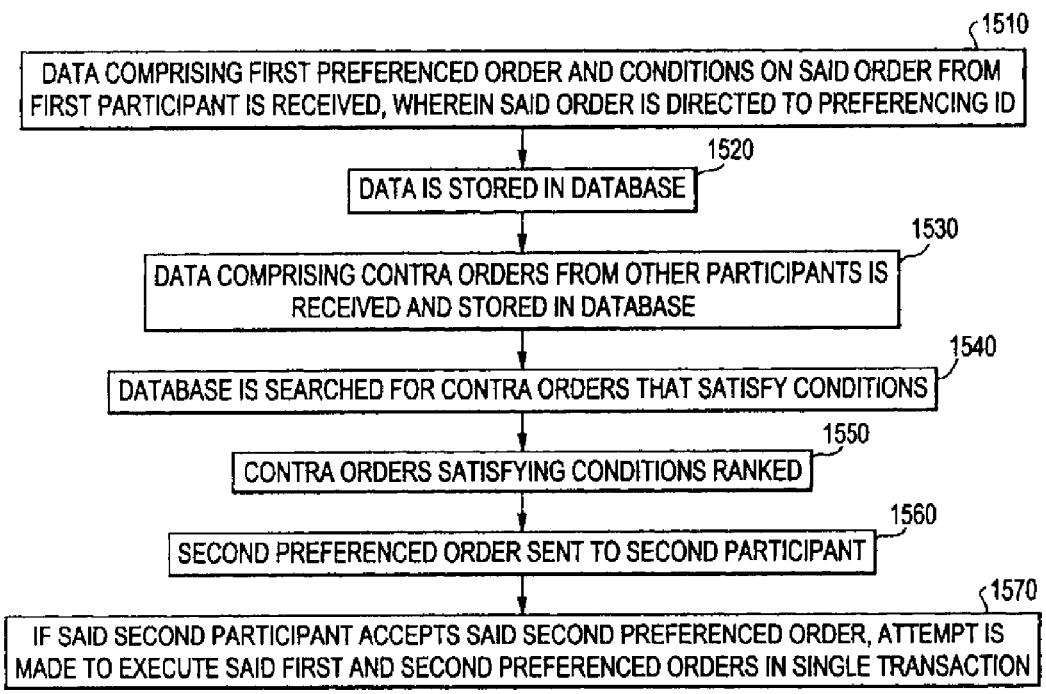

FIG. 15 depicts steps of another method of managing orders in a securities market. At step 1510, data comprising a first preferred order and conditions thereon is electronically received from a first market participant, wherein said first preferred order is directed to a preferencing ID. At step 1520, said received data is electronically stored in a database. At step 1530, data comprising contra orders from other market participants is electronically received and stored in said database. At step 1540, said database is searched for contra orders that satisfy said conditions on said order from said first market participant. At step 1550, market participants whose contra orders satisfy said conditions are ranked. At step 1560, a second preferred order is sent to a second market participant with an optimum or optimal ranking. At step 1570, if said second market participant accepts said second preferred order, an attempt is made to execute said first preferred order and said second preferred order as a single transaction, where either both legs of the trade carry through to completion or neither does.

Figure 16:
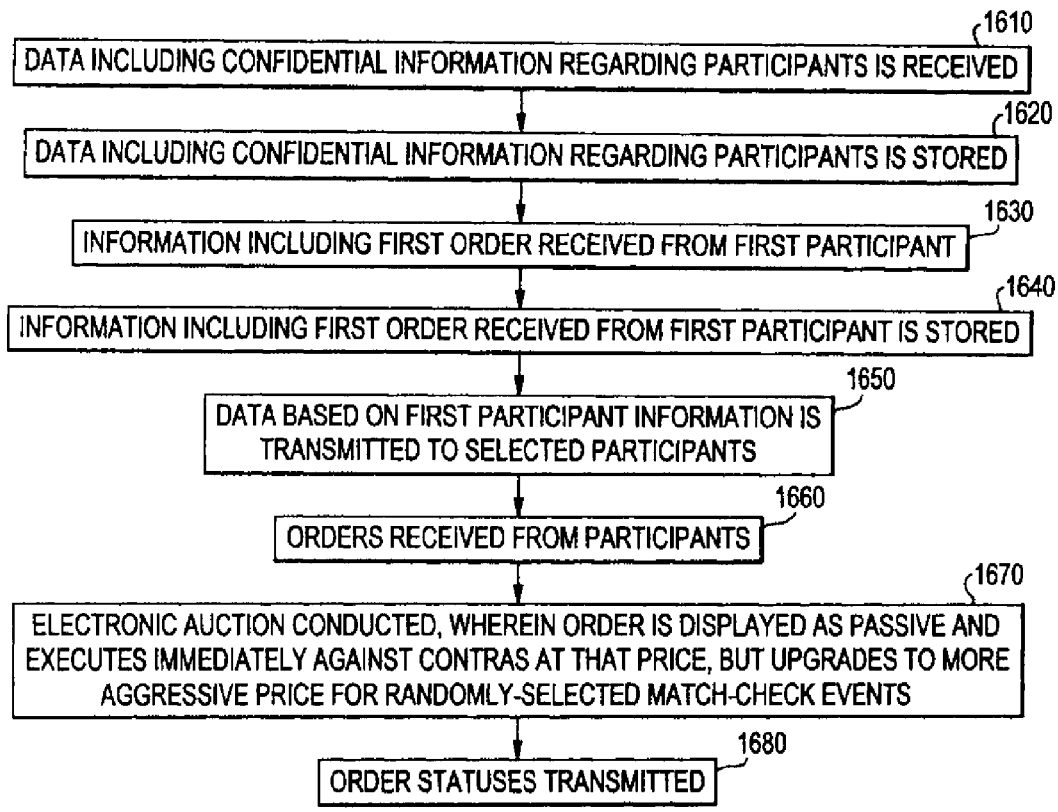

FIG. 16 depicts steps of a method of effecting a targeted auction. At step 1610, data including confidential information regarding market participants is electronically received. At step 1620, said received data regarding market participants is electronically stored. At step 1630, information including a first order is electronically received from a first market participant computer. At step 1640, said information received from said first market participant computer is electronically stored. At step 1650, data based on said information received from said first market participant computer is electronically transmitted to selected market participants. At step 1660, subsequent orders from said selected market participants are electronically received in response to said transmitted data. At step 1670, an electronic auction is conducted among orders including said orders received in response to said transmitted data; wherein in said electronic auction an order is displayed as a passive order and executes immediately against contra orders at that price, but upgrades its price to a more aggressive price for randomly-scheduled match check events where neither party has control of time of execution. At step 1680, the statuses of orders are electronically transmitted to the respective market participants who initiated them.

Figure 17:
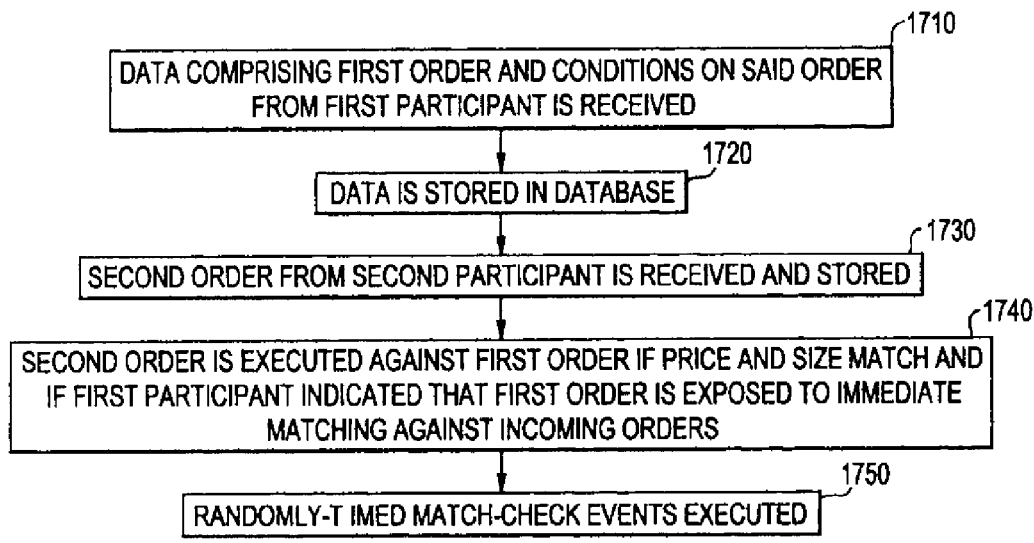

FIG. 17 depicts another method of order management. At step 1710, first participant information from a first market participant computer is electronically received, said first participant information including a first order and indicating: (i) whether said first order is exposed to random match check events; (ii) whether said first order is exposed to immediate execution against orders entered independently on the contra side; and (iii) whether said first order is exposed to immediate execution against orders entered in response to notification of said first order. At step 1720, said first participant information is electronically stored. At step 1730, a second order from a second participant is electronically received. At step 1740, said second order is executed against said first order if the price and size match and if said first participant information indicates that said first order is exposed to immediate matching against incoming orders. At step 1750, randomly-timed match check events are executed, wherein other orders match against the first order if the price and size match and if said first participant information indicates that said first order is to be exposed to randomly-timed match check events.

Figure 18:
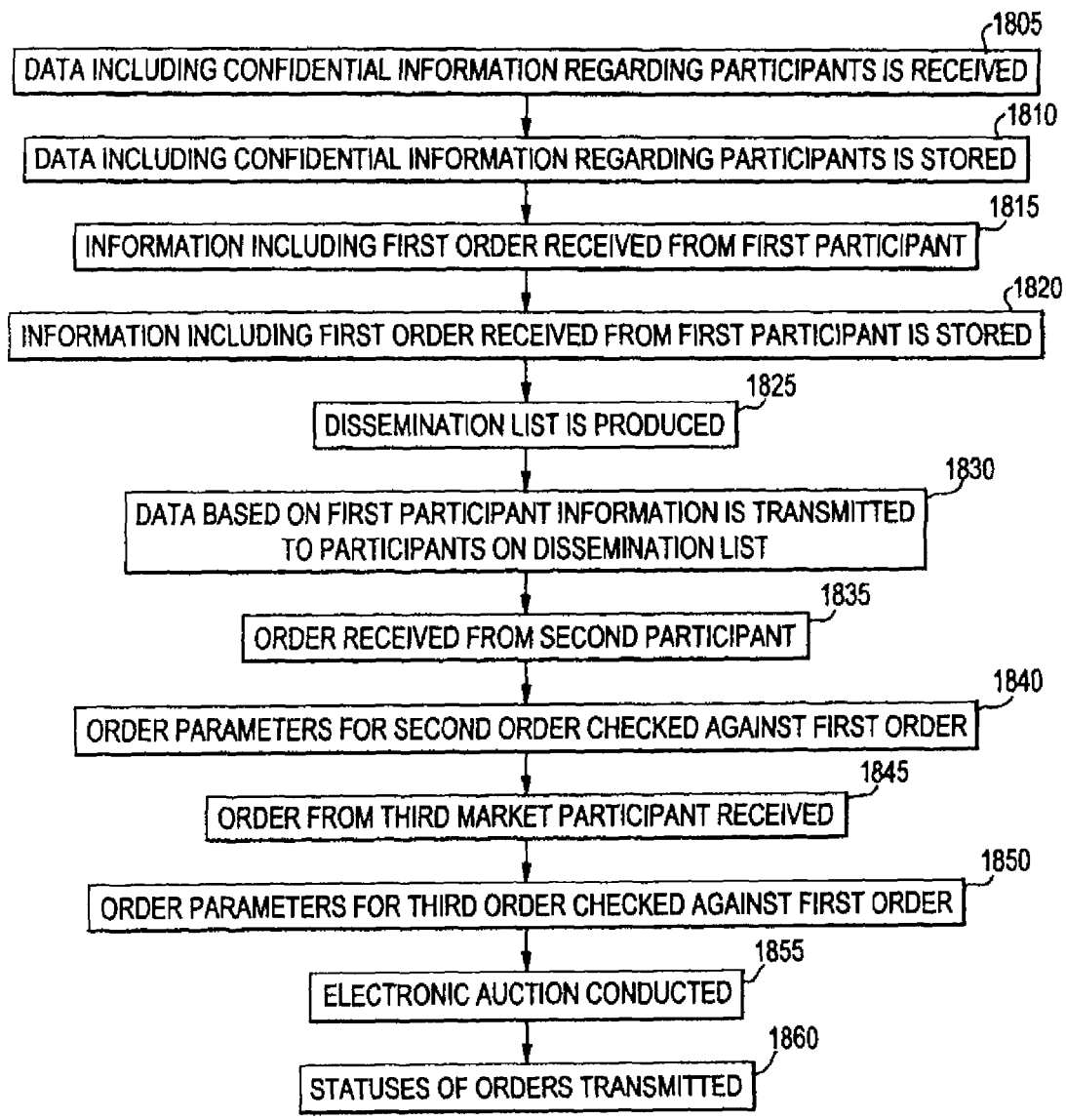

FIG. 18 depicts another method of effecting a targeted auction. At step 1805, data including confidential information regarding market participants is electronically received. At step 1810, said received data regarding market participants is electronically stored. At step 1815, information including a first order from a first market participant computer is electronically received. At step 1820, said information received from said first market participant computer is electronically stored. At step 1825, a targeted dissemination list of market participants is produced based on said stored data regarding market participants and said information received from said first market participant computer. At step 1830, data based on said information received from said first market participant computer is electronically transmitted to the market participants on said targeted dissemination list. At step 1835, an order from a second market participant is electronically received. At step 1840, order parameters for possible matching and execution of said second participant's order are checked against said first order. At step 1845, an order from a third market participant is electronically received in response to said transmitted data. At step 1850, order parameters are checked for possible matching and execution of said third participant's order against said first order. At step 1855, an electronic auction is conducted among orders including said orders received in response to said transmitted data. At step 1860, the statuses of orders are electronically transmitted to the respective market participants who initiated them.

Figure 19:
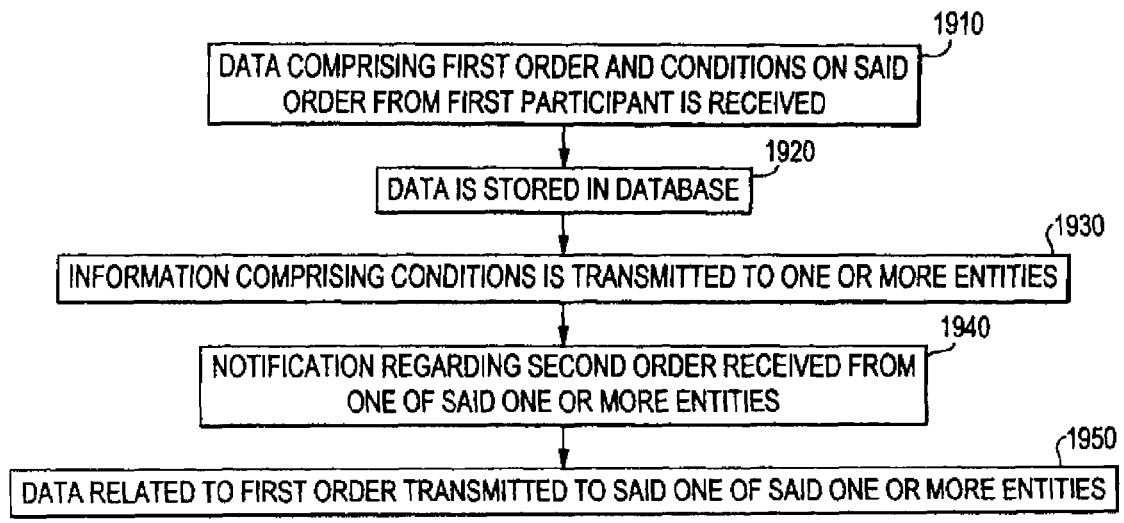

FIG. 19 depicts steps of another method of managing market information. At step 1910, data is electronically received from a first market participant, said data comprising an order to buy or sell market securities, and further comprising conditions on similar orders on the contra side. At step 1920, said data from said first market participant is electronically stored. At step 1930, information is electronically transmitted to one or more entities, said information comprising said conditions. At step 1940, notification from one of said one or more entities is electronically received, said notification comprising an indication that a second participant's order matches said conditions. At step 1950, information including data related to said order received from said first market participant is electronically transmitted to said one of said one or more entities.

Figure 20:
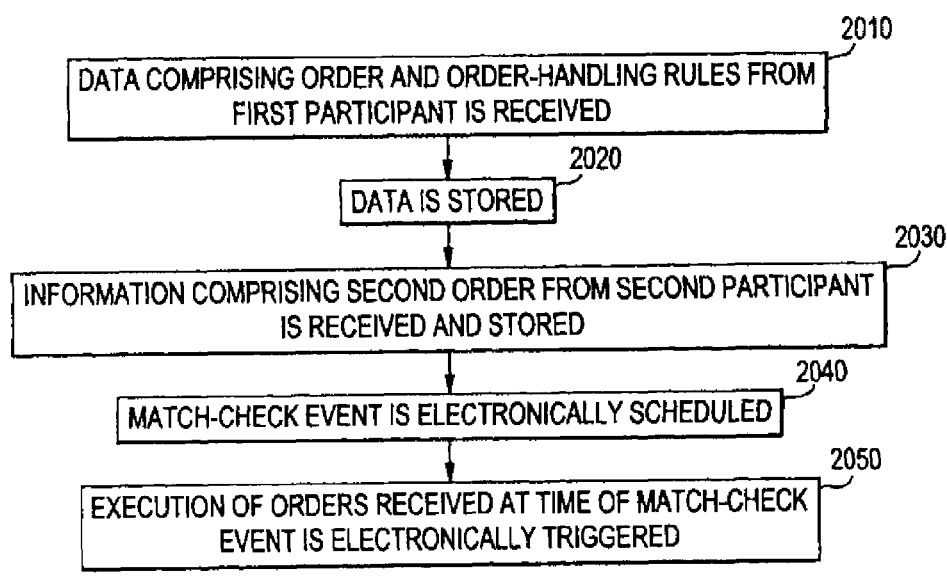

FIG. 20 depicts steps of another method of managing market information. At step 2010, data is electronically received from a first market participant, said data comprising an order to buy or sell market securities and data specifying order-handling rules that specify that the order should be exposed to randomly-scheduled match-check events. At step 2020, said data from said first market participant is electronically stored. At step 2030, information from a second market participant is electronically received, said information including an order to trade securities. At step 2040, a match-check event is electronically scheduled. At step 2050, execution of auctions with orders received at the time of said scheduled match-check event is electronically triggered.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments described herein are shown only for the purpose of illustration and not for the purpose of limitation.

What is claimed is:

1. A method of managing securities market information, comprising the steps of:
   (a) electronically receiving over a computer network data including confidential trading interest information of securities market participants;
   (b) electronically storing said received data including confidential trading interest information of securities market participants;
   (c) electronically receiving information from a first securities market participant's computer;
   (d) electronically storing said information received from said first securities market participant's computer;
   (e) producing with a processor a targeted dissemination list of securities market participants based on said confidential trading interest information of securities market participants and said information received from said first securities market participant's computer; and
   (f) electronically transmitting, only to the securities market participants on said targeted dissemination list, data based on said information received from said first securities market participant's computer.

2. The method of claim 1 wherein said information received from said first securities market participant's computer includes specific dissemination parameters.

3. The method of claim 1 wherein said data including confidential trading interest information of securities market participants is not disseminated to any market participant upon receipt or at any future time.

4. The method of claim 1 wherein said data including confidential trading interest information of securities market participants comprises data whose dissemination could affect the price or availability of a security.

5. The method of claim 1 wherein said targeted dissemination list excludes one or more market participants identified as unlikely to take the contra side to a specified trade.

6. The method of claim 1 wherein said first securities market participant's computer does not receive said confidential trading interest information of said securities market participants.

7. The method of claim 1 wherein said first securities market participant's computer does not receive information about size or composition of said targeted dissemination list.

8. The method of claim 1 wherein said targeted dissemination list comprises likely contra parties for said confidential trading interest.

9. The method of claim 1 wherein said targeted dissemination list excludes contra parties likely to misuse knowledge of said confidential trading interest.

10. The method of claim 1 further comprising the steps of:
    electronically receiving data from securities market participants on said targeted dissemination list;
    electronically storing said received data from securities market participants on said targeted dissemination list; and
    electronically transmitting information back to the first securities market participant's computer based on said stored data received from securities market participants on said targeted dissemination list.

11. The method of claim 10 further comprising the step of electronically transmitting information based on said stored data received from securities market participants on said targeted dissemination list to one or more other securities market participants.

12. The method of claim 10 wherein said information transmitted back to the first securities market participant's computer includes information indicating an interest in negotiation.

13. The method of claim 10, wherein said information electronically transmitted back to the first securities market participant's computer comprises an order.

14. A method of managing securities market information, comprising the steps of:
  (a) electronically receiving over a computer network data including confidential trading interest information of securities market participants;
  (b) electronically storing said received data including confidential trading interest information of securities market participants;
  (c) electronically receiving information from a first securities market participant's computer;
  (d) electronically storing said information received from said first securities market participant's computer; and
  (e) producing with a processor a targeted dissemination list of securities market participants based on said confidential trading interest information of securities market participants and said information received from said first securities market participant's computer,
  wherein data based on said information received from said first securities market participant's computer is electronically transmitted only to securities market participants on said targeted dissemination list.

15. The method of claim 14 wherein said information received from said first securities market participant's computer includes specific dissemination parameters.

16. The method of claim 14 wherein said data including confidential trading interest information of securities market participants is not disseminated to any market participant upon receipt or at any future time.

17. The method of claim 14 wherein said data including confidential trading interest information of securities market participants comprises data whose dissemination could affect the price or availability of a security.

18. The method of claim 14 wherein said targeted dissemination list excludes one or more market participants identified as unlikely to take the contra side to a specified trade.

19. The method of claim 14 wherein said first securities market participant's computer does not receive said confidential trading interest information of said securities market participants.

20. The method of claim 14 wherein said first securities market participant's computer does not receive information about size or composition of said targeted dissemination list.

21. The method of claim 14 further comprising the steps of:
  electronically receiving data from securities market participants on said targeted dissemination list;
  electronically storing said received data from securities market participants on said targeted dissemination list; and
  electronically transmitting information back to the first securities market participant's computer based on said stored data received from securities market participants on said targeted dissemination list.

22. The method of claim 16, wherein information based on said stored data received from securities market participants on said targeted dissemination list is electronically transmitted to one or more other securities market participants.

23. The method of claim 16 wherein said information transmitted back to the first securities market participant's computer includes information indicating an interest in negotiation.

24. The method of claim 16, wherein said information electronically transmitted back to the first securities market participant's computer comprises an order.

25. The method of claim 14 wherein said targeted dissemination list comprises likely contra parties for said confidential trading interest.

26. The method of claim 14 wherein said targeted dissemination list excludes contra parties likely to misuse knowledge of said confidential trading interest.

* * * * *